(12) United States Patent
Sun et al.

(10) Patent No.: US 12,735,854 B2
(45) Date of Patent: Sep. 15, 2026

(54) FOOT FRAME BOTTOM PLATE TYPE FIXED PARTS, SEALED INNER LINING STRUCTURE, UNDERGROUND CHAMBER AND CONSTRUCTION METHOD

(71) Applicant: INSTITUTE OF ROCK AND SOIL MECHANICS, CHINESE ACADEMY OF SCIENCES, Wuhan (CN)

(72) Inventors: Guanhua Sun, Wuhan (CN); Zhangxing Wang, Wuhan (CN); Xianyang Yu, Wuhan (CN); Chunguang Li, Wuhan (CN)

(73) Assignee: INSTITUTE OF ROCK AND SOIL MECHANICS, CHINESE ACADEMY OF SCIENCES, Wuhan (CN)

( * ) Notice: Subject to any disclaimer, the term of this patent is extended or adjusted under 35 U.S.C. 154(b) by 82 days.

(21) Appl. No.: 18/737,052

(22) Filed: Jun. 7, 2024

(65) Prior Publication Data

US 2025/0092630 A1 Mar. 20, 2025

(51) Int. Cl.
*E02D 29/00* (2006.01)
*E02D 29/16* (2006.01)
(Continued)

(52) U.S. Cl.
CPC ............. *E02D 29/04* (2013.01); *E02D 29/16* (2013.01); *F17C 1/007* (2013.01); *G01M 3/26* (2013.01);
(Continued)

(58) Field of Classification Search
CPC ..... E02D 29/04; E02D 29/16; E02D 2450/00; E02D 2600/20; E02D 29/12; E02D 29/14; F17C 1/007; F17C 2203/0604; F17C 2203/0678; F17C 2205/018; F17C 2260/038; F17C 2270/0155; G01M 3/26; E21D 13/00; E21D 11/00; E21D 11/40
(Continued)

(56) References Cited

FOREIGN PATENT DOCUMENTS

JP 2006336191 A * 12/2006

OTHER PUBLICATIONS

English Machine Translation of JP-2006336191-A (Year: 2006).*
(Continued)

*Primary Examiner* — Laura E. Parker
(74) *Attorney, Agent, or Firm* — Platinum Intellectual Property PC

(57) ABSTRACT

The present invention provides a foot frame bottom plate type fixed part, a sealed inner lining structure, an underground chamber, belonging to the field of compressed air energy storage technology. The skeleton includes a fixed bottom plate and an umbrella shaped tripod, which is equipped with a connecting part and an umbrella shaped part. The umbrella shaped part is set at the top of the connecting part. The umbrella shaped tripod is fixedly connected to the fixed bottom plate in the length direction, forming a semi open containment space clamp. The sealing inner lining structure includes an airtight layer and a foot rest bottom plate shaped fixed part. The underground chamber includes a concrete lining layer and a sealed lining structure. Its construction period is shorter than that of welded steel plates, and the cost is lower.

16 Claims, 32 Drawing Sheets

(51) Int. Cl.
*F17C 1/00* (2006.01)
*G01M 3/26* (2006.01)

(52) U.S. Cl.
CPC ...... *E02D 2450/00* (2013.01); *E02D 2600/20* (2013.01); *F17C 2203/0604* (2013.01); *F17C 2203/0678* (2013.01); *F17C 2205/018* (2013.01); *F17C 2260/038* (2013.01); *F17C 2270/0155* (2013.01)

(58) Field of Classification Search
USPC ........................................................ 220/567.1
See application file for complete search history.

(56) References Cited

OTHER PUBLICATIONS

Sequentia, PVC Connector Wal Panel Mould, retrieved from https://www.lowes.com/pd/Sequentia-1-42-in-x-8-ft-Finished-Vinyl-Wall-Panel-Moulding/3044511 (Year: 2022).*

* cited by examiner 6
4

FOOT FRAME BOTTOM PLATE TYPE FIXED PARTS, SEALED INNER LINING STRUCTURE, UNDERGROUND CHAMBER AND CONSTRUCTION METHOD

RELATED APPLICATIONS

This application is a Non-provisional Application under 35 USC § 111 (a), which claims priorities to Chinese Patent Application No. 202311635336.0, filed Nov. 29, 2023, Chinese Patent Application No. 202311632645.2, filed Nov. 29, 2023, Chinese Patent Application No. 202311534989.X, filed Nov. 15, 2023, Chinese Patent Application No. 202311213321.5, filed Sep. 15, 2023, and Chinese Patent Application No. 202311211907.8, filed Sep. 15, 2023, the disclosure of all of which is hereby incorporated by reference in its entirety.

TECHNICAL FIELD

The present invention relates to the field of compressed air energy storage technology, in particular to foot frame bottom plate shaped components, sealed inner lining structures, underground chambers, and construction methods.

BACKGROUND TECHNOLOGY

Compressed air energy storage technology is a high-capacity, long-term physical energy storage technology that does not involve the combustion of fossil fuels, does not emit any harmful substances, and is more environmentally friendly. It can greatly improve the spatiotemporal structure of power generation and consumption in the power grid, increase the peak shaving capacity of the power grid, and solve the intermittent problem of renewable energy. It is being widely promoted and applied in China. The compressed air energy storage system mainly uses ground steel tanks/pipes, salt rock caves, and artificial lined chambers as high-pressure air storage containers. Large scale storage devices currently rely on salt caves and artificial lined chambers. With the gradual advancement of industrialization, artificial lined chambers will gradually become a widely used gas storage method. Unlike general underground chambers, artificial lined chambers specifically designed for gas storage will withstand high internal pressure, high temperature changes, and high-frequency alternating loads, posing new challenges to the design of chamber sealing layers.

SUMMARY OF THE INVENTION

In view of this, the present invention provides a foot frame bottom plate type fixed component, a sealed inner lining structure, an underground chamber, and a construction method. The foot frame bottom plate type fixed component can be combined to form a sealed inner lining structure, which is constructed for the underground chamber and forms the sealed inner lining structure on the inner wall of the underground chamber. The construction period is shorter than that of welded steel plates, the cost is lower, and it is more suitable for practical use.

In order to achieve the first purpose mentioned above, the technical solution of the foot rest bottom plate shaped fixed part provided by the present invention is as follows:

The foot rest bottom plate shaped fixed part (2) provided by the present invention is in a circular shape, and the foot rest bottom plate shaped fixed part (2) includes a fixed bottom plate (7) and an umbrella shaped foot rest (8). After cutting and unfolding the foot rest bottom plate shaped fixed part (2) along the axis direction, The fixed base plate (7) has a length direction and a width direction, The umbrella shaped tripod (8) has a length direction and a width direction, and the umbrella shaped tripod (8) is equipped with a connecting part and an umbrella shaped part. The umbrella shaped part is set at the top of the connecting part, so that the umbrella shaped part faces the connecting part and has protrusions on both sides in the length direction of the umbrella shaped tripod (8), The umbrella shaped tripod (8) is fixedly connected to the fixed bottom plate (7) along the length direction of the fixed bottom plate (7) using its connecting part, so that a semi open containment space clamp is formed between the umbrella shaped part of the umbrella shaped tripod (8) and the fixed bottom plate (7), so that the height of the semi open containment space near the connecting part of the umbrella shaped tripod (8) is h1, and the height of the semi open containment space near the open side position of the umbrella shaped tripod (8) is h2, h1>h2.

The foot rest bottom plate shaped fixed part provided by the present invention can further be achieved by the following technical measures.

As a preferred option, the connecting part of the umbrella shaped tripod (8) is integrally formed with the umbrella shaped part.

As a preferred option, the umbrella shaped tripod (8) is fixedly connected to the fixed base plate (7) by fastening bolts, or the umbrella shaped tripod (8) is integrally formed with the fixed base plate (7).

As a preferred option, the foot rest bottom plate shaped component (2) is made of corrosion-resistant steel.

As a preferred option,

The circular shaped bottom plate shaped fixed part (2) of the tripod is integrally formed, Alternatively, The tripod base plate shaped shaping component (2) comprises multiple tripod base plate shaped shaping components, which are docked and assembled from the width direction to form a circular tripod base plate shaped shaping component (2).

In order to achieve the second objective mentioned above, the technical solution of the sealing lining structure provided by the present invention is as follows:

The sealing inner lining structure provided by the present invention includes an airtight layer (3) and at least one foot rest bottom plate shaped fixing member (2) provided by the present invention, The airtight layer (3) is provided on the foot rest bottom plate shaped part (2) through a clamp with a semi open storage space.

The sealing inner lining structure provided by the present invention can further be achieved by the following technical measures.

As a preferred choice, the airtight layer (3) is made of a material that can deform under pressure.

As a preferred option, the edge of the airtight layer (3) is provided with a fitting portion that is embedded with the semi open containment space clamp, and the airtight layer (3) is set on the foot frame bottom plate shaped fixed part (2) through the fitting portion. As a preferred option, the tripod base plate shaped fixed part (2) comprises multiple, The centers of multiple circular foot rest bottom plate shaped fixed parts (2) are coaxial, and the multiple circular foot rest bottom plate shaped fixed parts (2) are connected as a whole through the airtight layer (3);

The airtight layer (3) is connected to the foot rest bottom plate shaped fixed member (2) through a clamp with a semi open storage space, making the sealing inner lining structure a cylindrical sealing inner lining structure.

As a preferred arrangement, multiple annular shaped foot rest bottom plate shaped fixed parts (2) are uniformly arranged along the axial direction of the cylindrical sealing inner lining mechanism.

In order to achieve the third objective mentioned above, the technical solution of the underground chamber provided by the present invention is as follows:

The underground chamber provided by the present invention includes a concrete lining layer (1) and a sealed lining structure provided by the present invention, The inner wall of the concrete lining layer (1) is cylindrical, The sealing inner lining structure is fixed on the inner wall of the concrete lining layer (1) through the fixed bottom plate (10) of the foot frame bottom plate shaped shaping member (2).

In order to achieve the fourth objective mentioned above, the technical scheme of the construction method for the underground chamber provided by the present invention is as follows:

The construction method of the underground chamber provided by the present invention includes the following steps:

According to the inner diameter of the underground chamber, a circular foot frame bottom plate shaped fixing member (2) is fixedly arranged on the inner wall of the underground chamber, so that the outer diameter of the circular foot frame bottom plate shaped fixing member (2) matches the inner diameter of the underground chamber;

The airtight layer (3) is embedded in the annular footrest bottom plate shaped fixed member (2) through the semi open capacity space clamp, so that the inner wall of the underground chamber forms the sealing inner lining structure provided by the present invention.

The construction method of the underground chamber provided by the present invention can further be achieved by adopting the following technical measures.

As a preferred method, according to the inner diameter of the underground chamber, the outer diameter of the annular foot frame bottom plate shaped fixed part (2) is matched with the inner diameter of the underground chamber, including the following steps:

Drill the first type of connecting hole on the inner wall of the underground chamber;

Adjust the position of the foot frame bottom plate fixed part (2) so that the second connecting hole of the foot frame bottom plate fixed part (2) corresponds to the position of the first connecting hole on the inner wall of the underground chamber;

Screw the locking bolt (5) into the first and second connecting holes simultaneously, so that the foot frame bottom plate shaped fixing piece (2) is fixed to the inner wall of the underground chamber.

As a preferred method, after the step of embedding the airtight layer (3) into the hollow through the semi open capacity space clip, so that the inner wall of the underground chamber forms the sealing lining structure provided by the present invention, the following steps are further included:

Conduct gas storage tests on the underground chamber to determine its sealing performance;

Real time monitoring shall be carried out for possible air leakage points in the underground chamber.

As a preferred method, during the process of real-time monitoring of possible air leakage points in the underground chamber, the possible air leakage points include: the connection between the airtight layer (3) and the foot frame bottom plate shaped fixed part (2), the connection between the connection part of the foot frame bottom plate shaped fixed part (2) and the umbrella shaped part, the connection between the fixed bottom frame of the foot frame bottom plate shaped fixed part (2) and the inner wall of the underground chamber, and one or more parts of the airtight layer (3) itself.

As a preferred method, real-time monitoring of potential air leakage points in the underground chamber includes the following steps:

Install gas flow monitoring instruments at potential leakage points in the underground chamber, and set location labels for each gas flow monitoring instrument;

Set an alarm threshold for the gas flow monitoring instrument based on its location;

When an abnormal gas flow alarm occurs, determine the leakage point of the underground chamber based on the location label of the gas flow monitoring instrument that triggered the alarm.

The foot rest bottom plate shaped fixed part 2 provided by the present invention can be embedded with an airtight layer 3 through the semi open capacity space clamp formed by it. Since the height of the semi open capacity space near the connection part of the umbrella shaped foot rest is greater than the height of the semi open capacity space near the open side position of the umbrella shaped foot rest, it is possible to use the outer edge of the bulk foot rest 8 to form a fitting between the airtight layer 3, thereby avoiding the displacement or detachment of the airtight layer 3 and ensuring airtightness. Therefore, it is formed inside the concrete lining layer 1 of the underground chamber. Its construction period is shorter than that of welded steel plates, the cost is lower, it has good sealing performance, and the replacement of components is convenient and easier to maintain. On the premise of ensuring tightness, the airtightness can meet the usage requirements. Due to the circular shape of the bottom plate shaped fixed part 2 of the tripod, it can ensure that the indoor lining of the underground tunnel is always circular and isotropic. In addition, the airtight layer 3 has a short construction period, and the components can be prefabricated. Compared to the traditional steel plate lining that requires on-site welding, it can save a lot of time and cost lower. During maintenance, the damaged parts can be directly replaced.

DESCRIPTION OF FIGURES

By reading the detailed description of the preferred implementation methods in the following text, various other advantages and benefits will become clear to ordinary technical personnel in this field. The accompanying drawings are only intended to illustrate preferred embodiments and are not considered a limitation of the present invention. And throughout the entire diagram, the same reference symbols are used to represent the same components. In the attached figure.

SPECIFIC IMPLEMENTATION METHODS

Figures 1, 2:
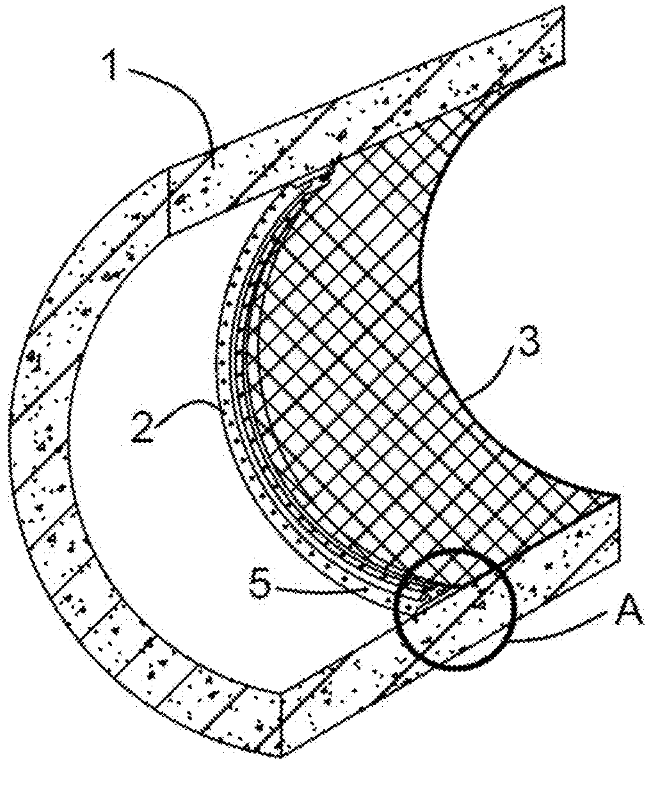
FIG. 1 is a typical cross-sectional structural diagram of an underground chamber provided in an embodiment of the present invention.
FIG. 2 is a schematic diagram of the partially enlarged structure of Part A in FIG. 1.
Figure 3:
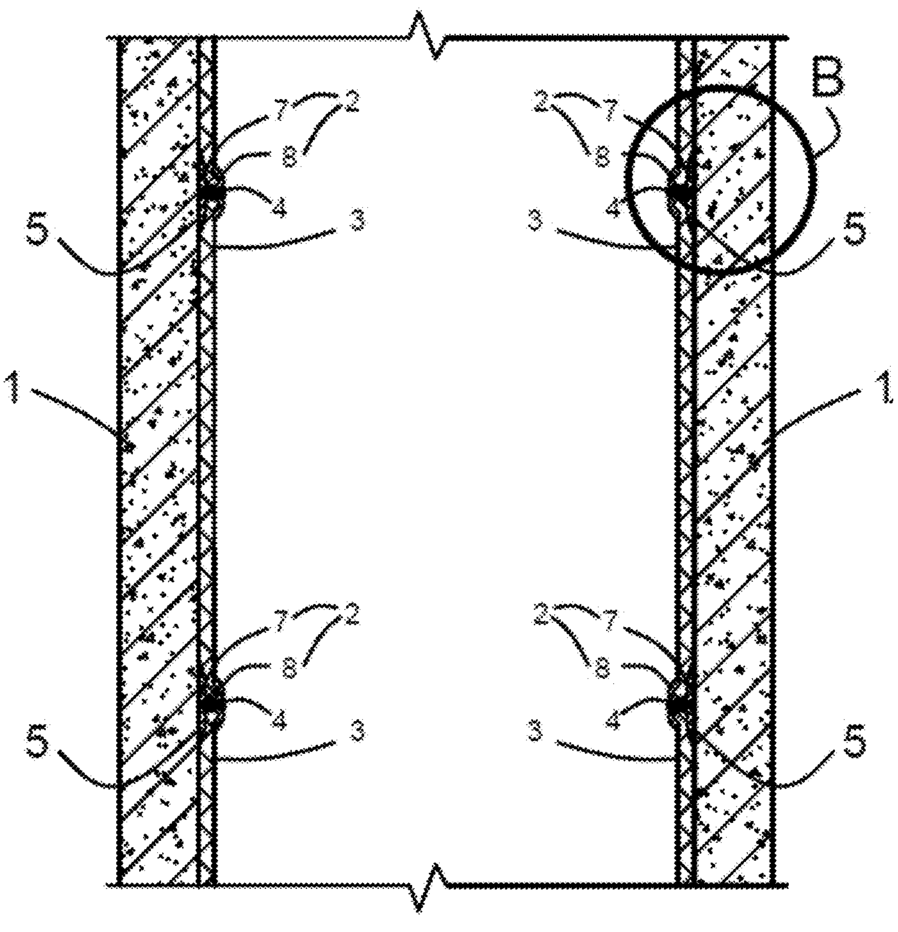
FIG. 3 is a schematic diagram of the local structure of the axial section of the underground chamber provided in the embodiment of the present invention.
Figure 4:
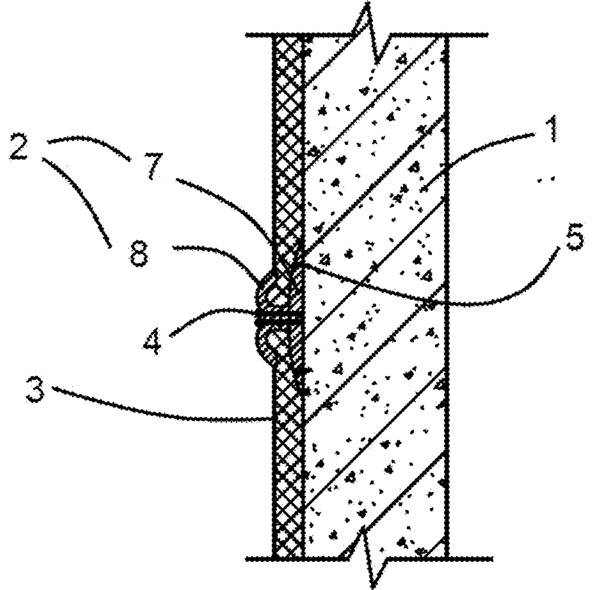
FIG. 4 is a schematic diagram of the partially enlarged structure of Part B in FIG. 3.
Figure 5:
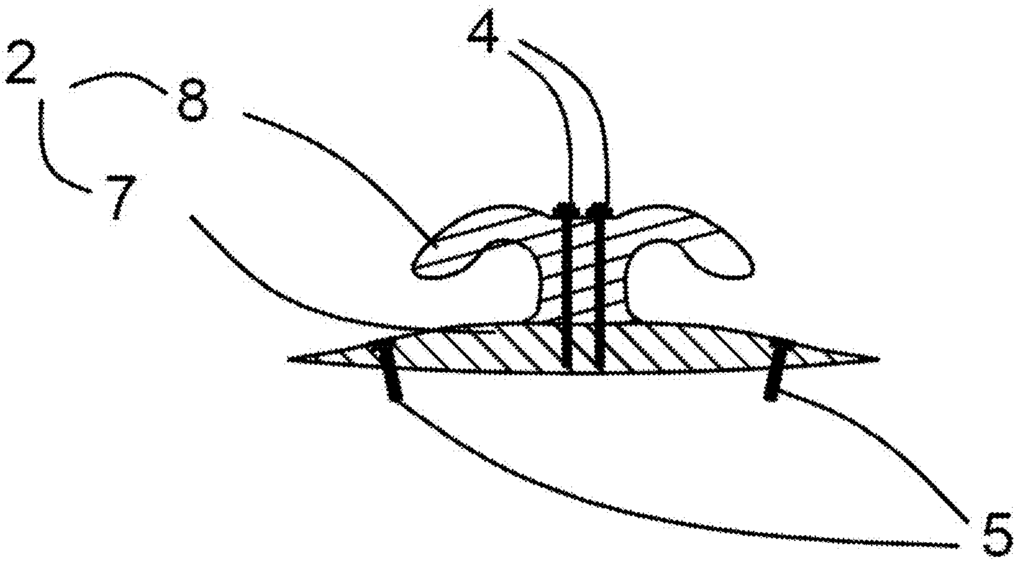
FIG. 5 is a structural schematic diagram of a typical cross-section of the foot rest bottom plate shaped fixed part provided in an embodiment of the present invention.
Figure 6:
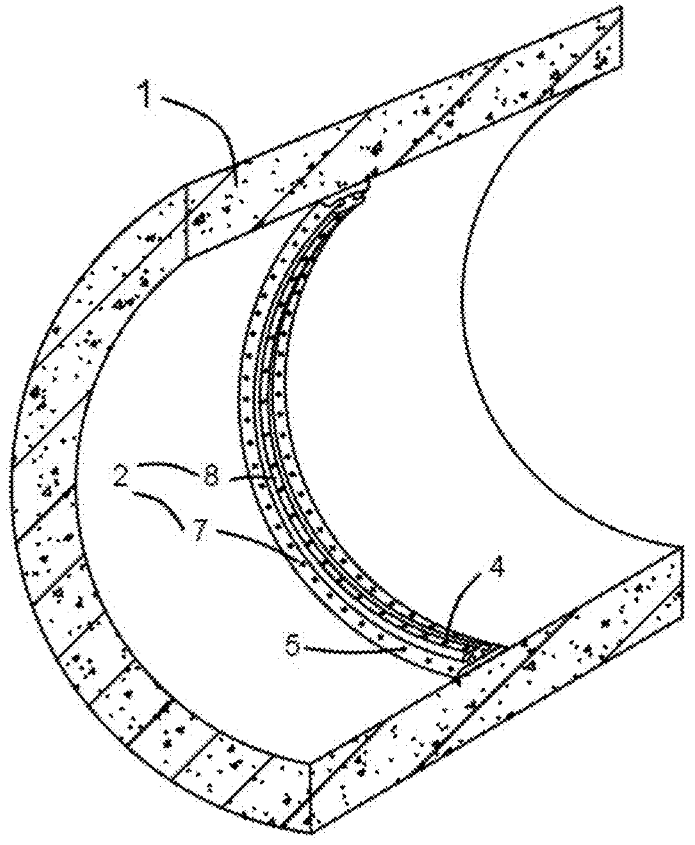
FIG. 6 is a schematic diagram of the structure provided by the embodiment of the present invention, where the circular foot frame bottom plate shaped fixed part is adapted to the inner wall of the underground chamber.
Figure 7:
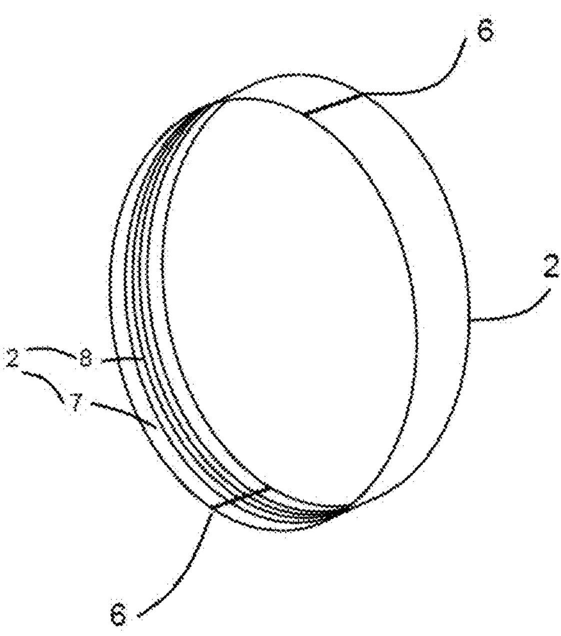
FIG. 7 is a schematic diagram of a typical three-dimensional structure of a circular footrest bottom plate shaped fixed part provided in an embodiment of the present invention.
Figure 8:
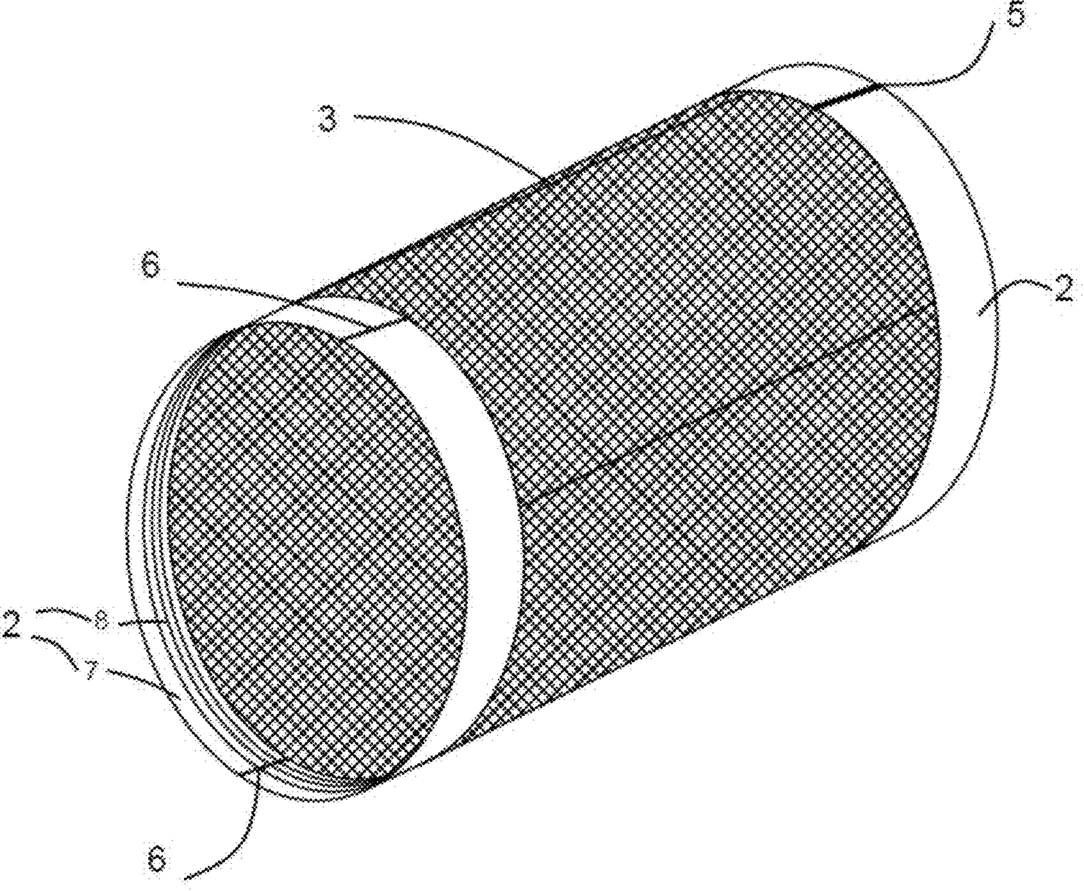
FIG. 8 is a three-dimensional schematic diagram of a typical direction of the sealing lining structure provided in an embodiment of the present invention.
Figure 9:
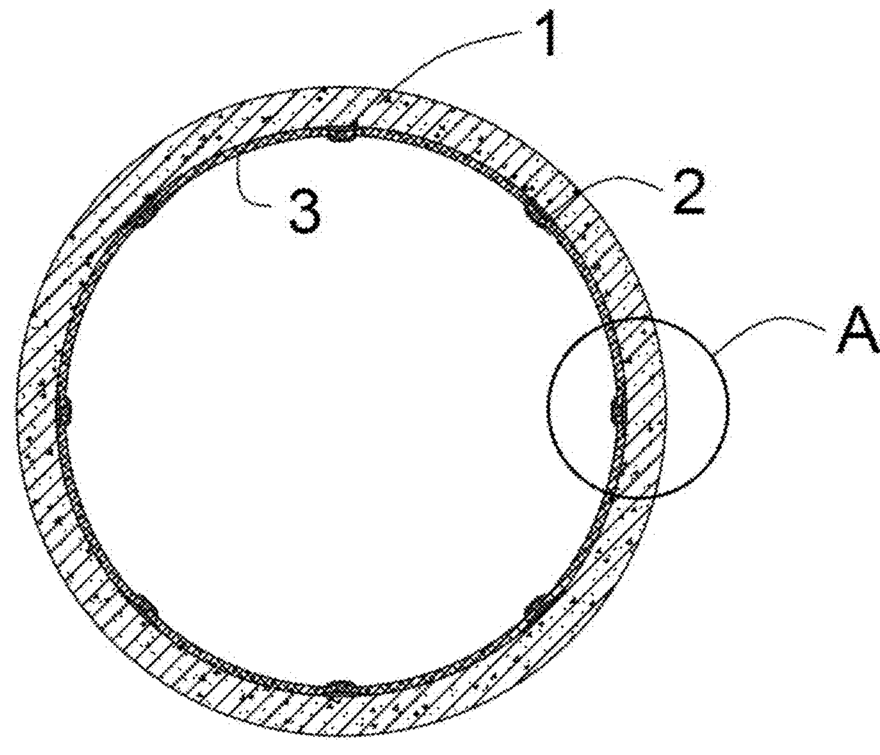
FIG. 9 is a schematic diagram of the radial cross-sectional structure of the underground gas storage provided in an embodiment of the present invention.
Figure 10:
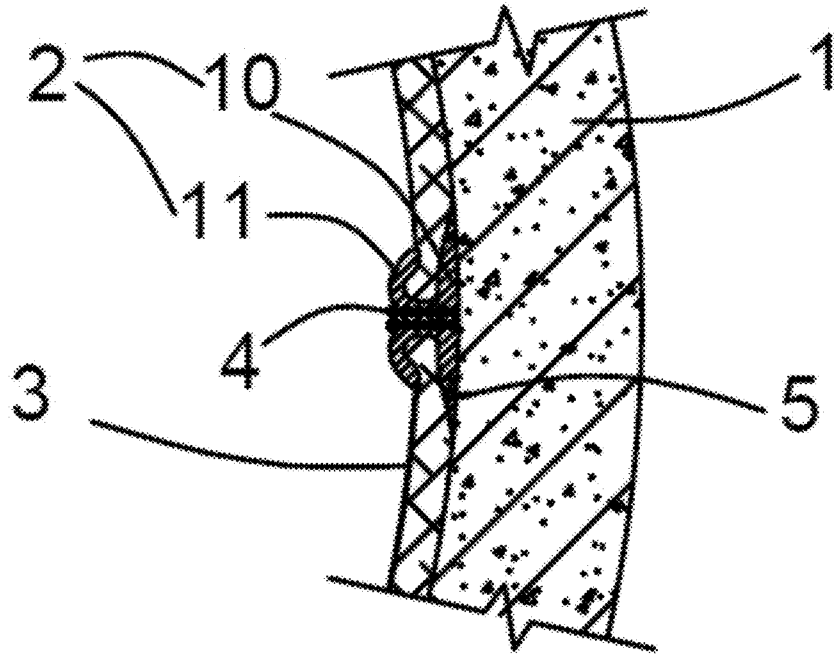
FIG. 10 is a schematic diagram of the partially enlarged structure of Part A in FIG. 9.
Figure 11:
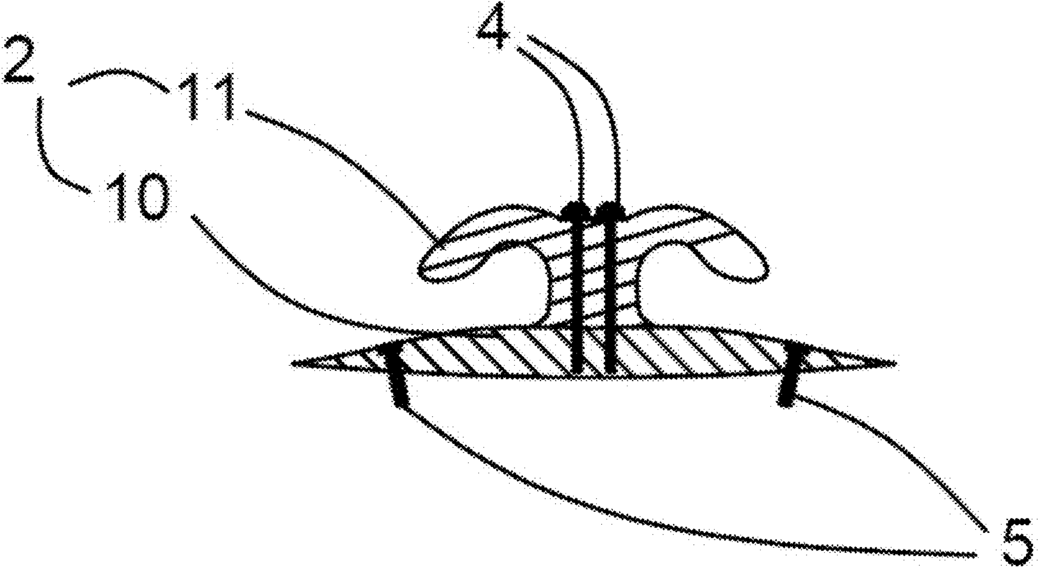
FIG. 11 is a structural schematic diagram of a typical cross-section of the footrest bottom plate type skeleton provided in an embodiment of the present invention.
Figure 12:
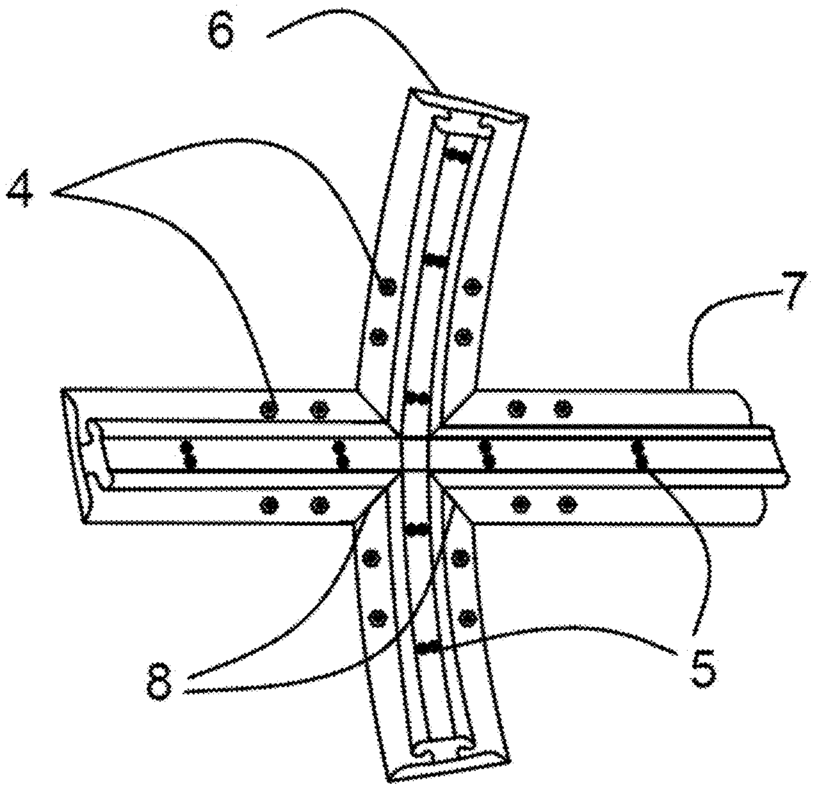
FIG. 12 is a schematic diagram of the structure of the connection points of the footrest bottom plate type skeleton provided in the embodiment of the present invention, which are crisscrossed vertically and horizontally.
Figure 13:
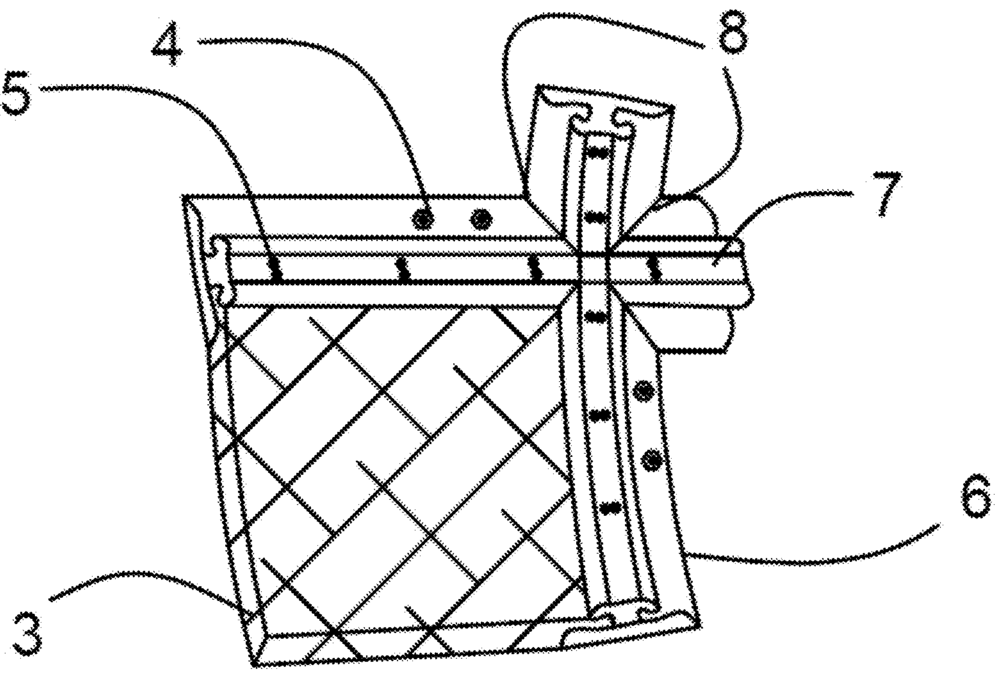
FIG. 13 is a structural schematic diagram of a typical cross-section after connecting the footrest bottom plate type skeleton and the airtight layer provided in the embodiment of the present invention.
Figure 14:
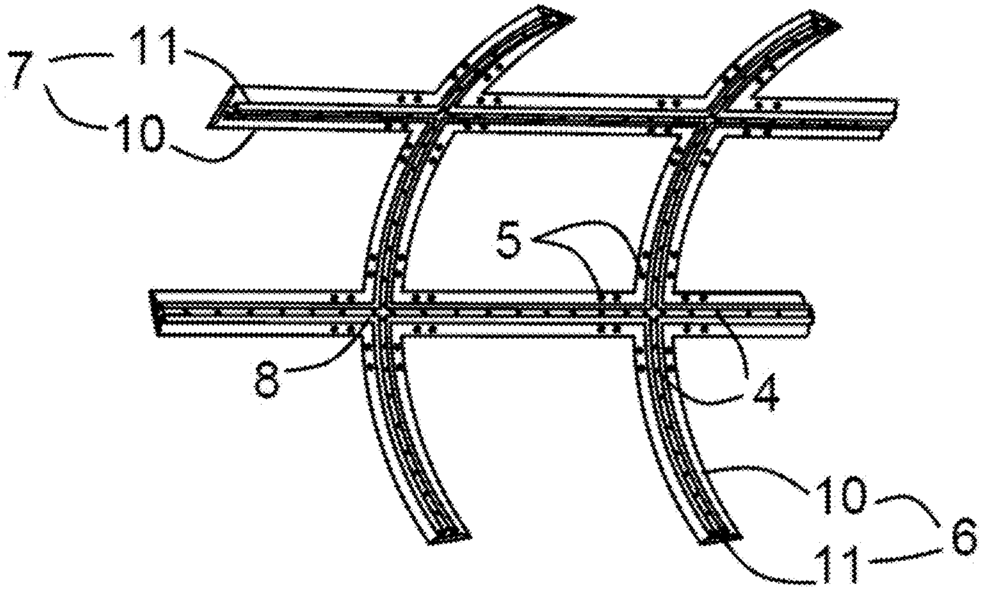
FIG. 14 is a schematic diagram of a typical cross-sectional structure of a footrest bottom plate skeleton with a sealed inner lining structure of a cylindrical inner wall provided in an embodiment of the present invention.
Figure 15:
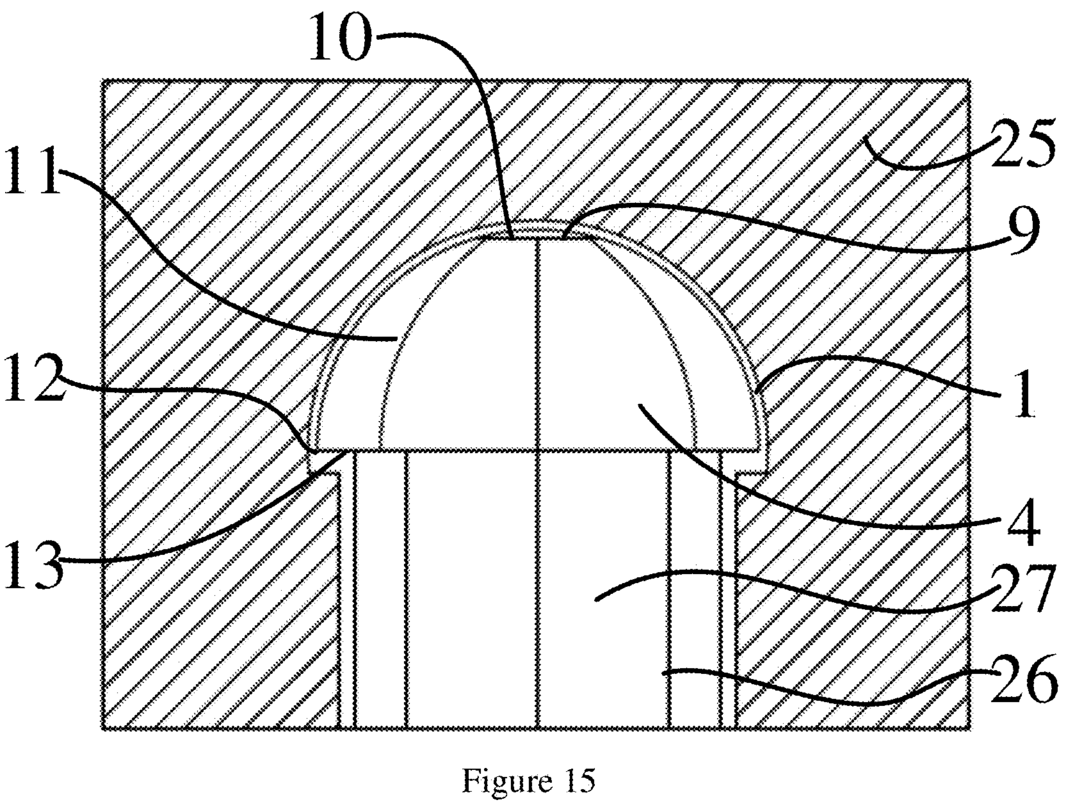
FIG. 15 is a cross-sectional view of the relationship between the sealing chamber, concrete lining, and surrounding rock structure involved in the dome sealing lining structure of the foot frame type underground rock lining chamber provided in the embodiment of the present invention.
Figure 16:
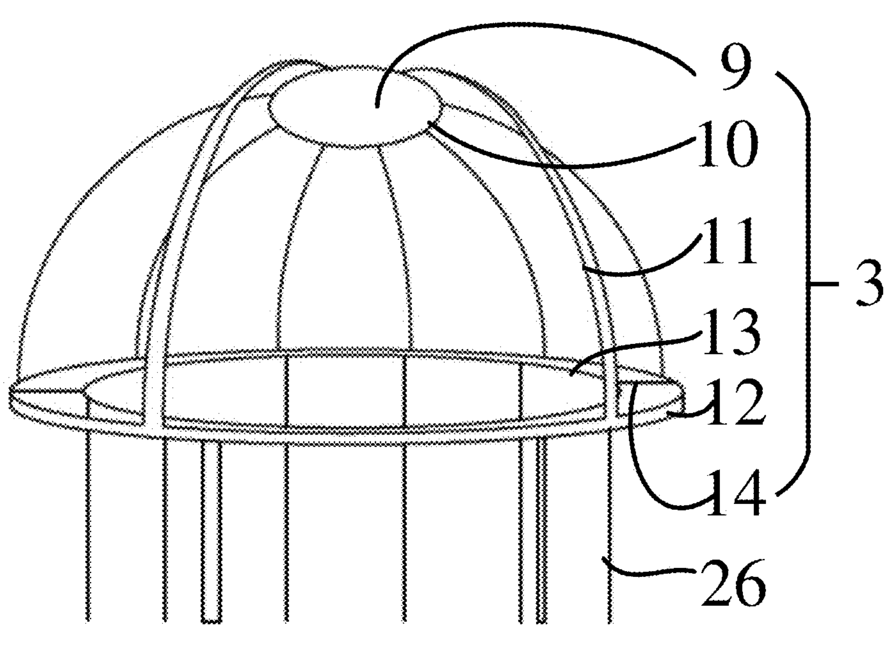
FIG. 16 is a three-dimensional schematic diagram of the combined dome sealing inner lining structure of the sealed underground rock lining chamber provided in the embodiment of the present invention, which relates to the dome sealing inner lining structure of the footrest type underground rock lining chamber.
Figure 17:
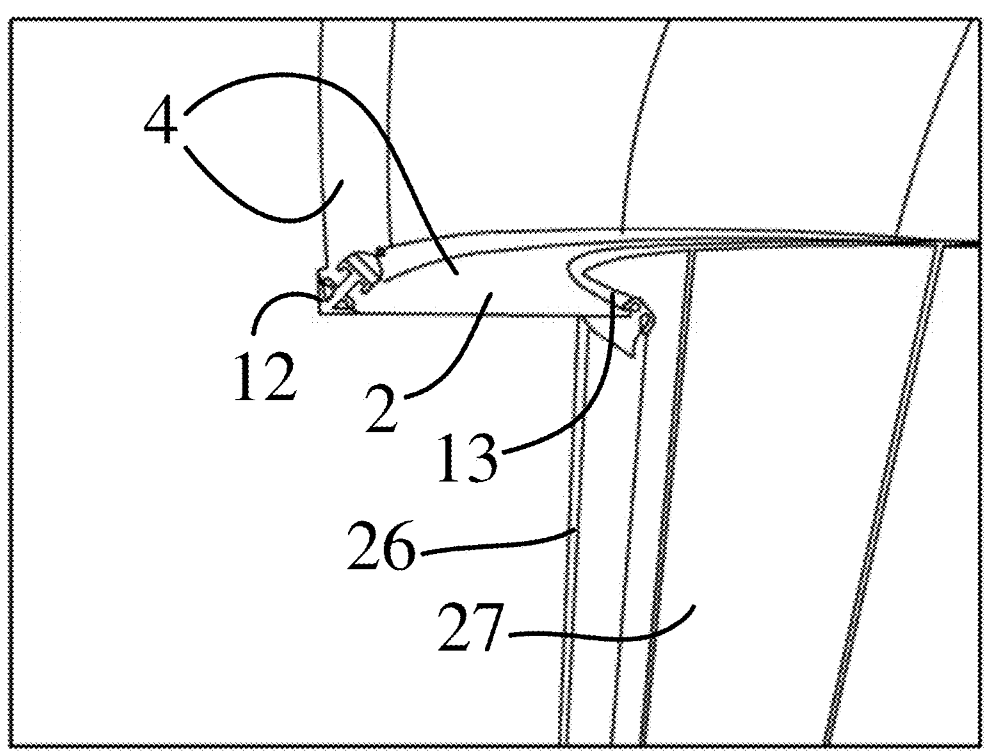
FIG. 17 shows the axial sectional view of the annular platform of the sealed underground rock lining chamber provided in the embodiment of the present invention, which is related to the dome sealing lining structure of the footrest type underground rock lining chamber.
Figure 18:
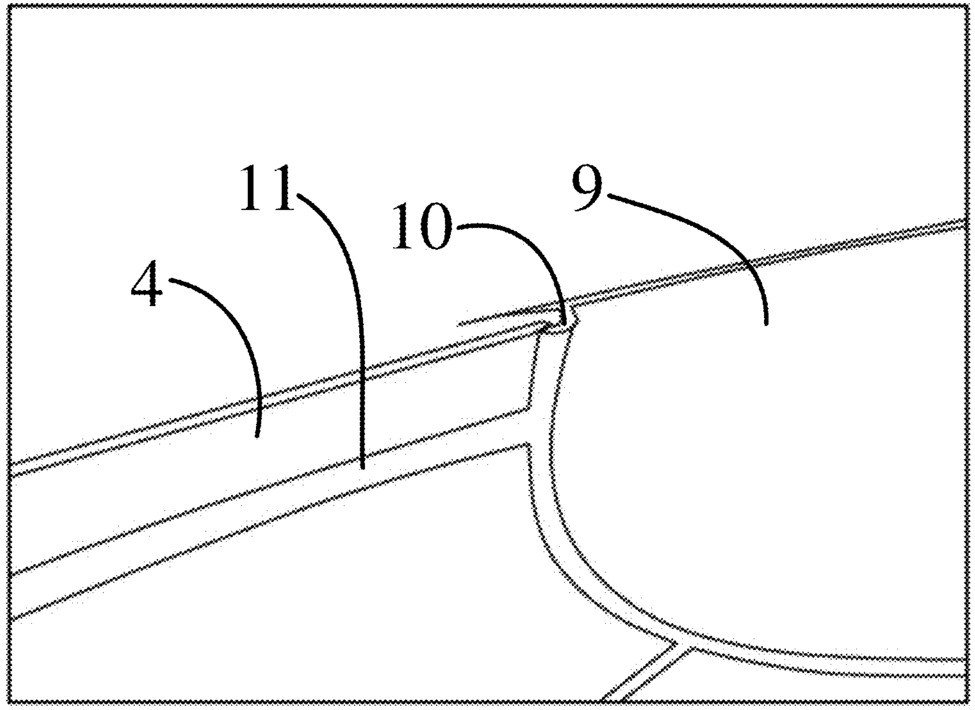
FIG. 18 shows the axial sectional view of the spherical shell shaped plate on the dome of the sealed underground rock lining chamber provided in the embodiment of the present invention, which is related to the dome sealing lining structure of the footrest type underground rock lining chamber.
Figure 19:
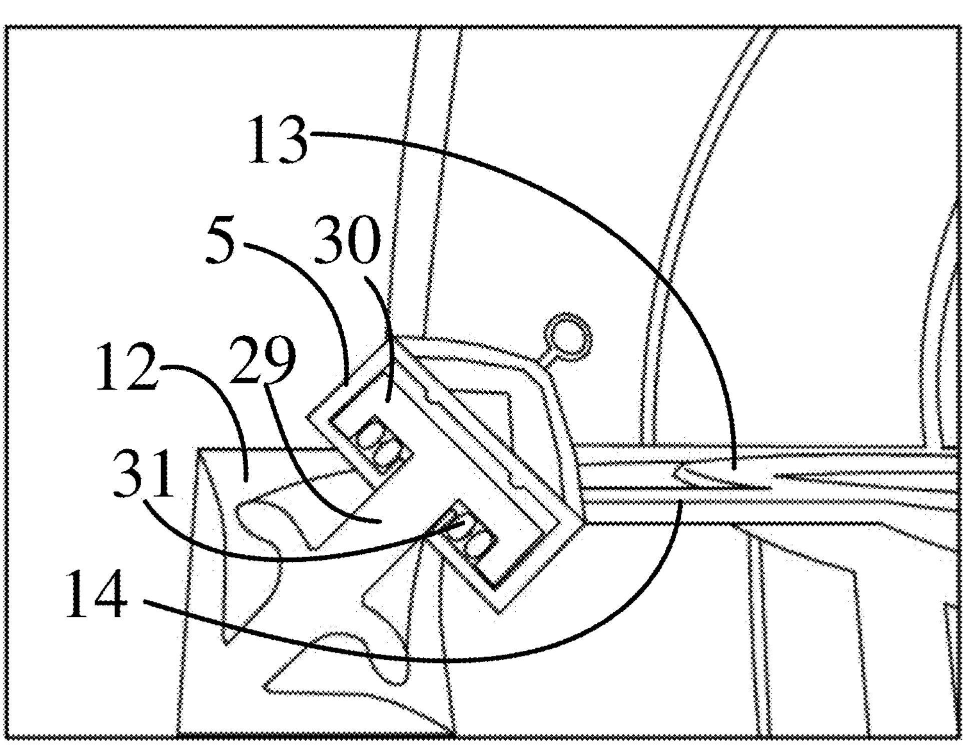
FIG. 19 is a schematic diagram of the sliding safety lock connection device and the outer ring annular skeleton connection involved in the dome sealing inner lining structure of the foot frame type underground rock lining cave provided in the embodiment of the present invention.
Figure 20:
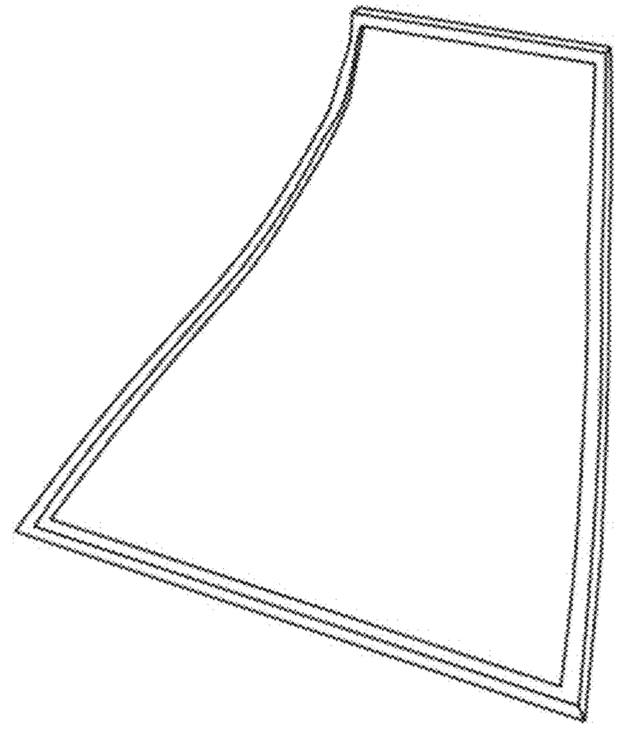
FIG. 20 is a three-dimensional schematic diagram of the fan-shaped airtight layer involved in the dome sealing lining structure of the footrest type underground rock lining cave provided in the embodiment of the present invention.
Figure 21:
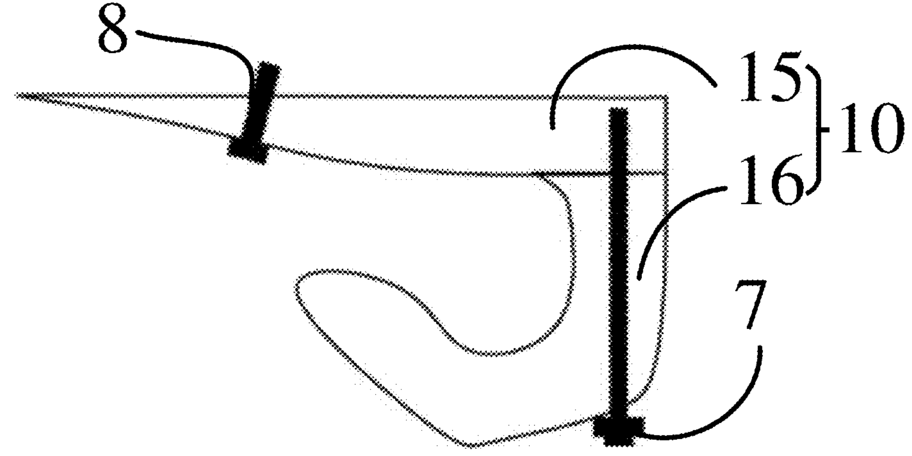
FIG. 21 is a cross-sectional view of the first foot frame bottom plate type connector involved in the dome sealing lining structure of the foot frame type underground rock lining chamber provided in the embodiment of the present invention.
Figure 22:
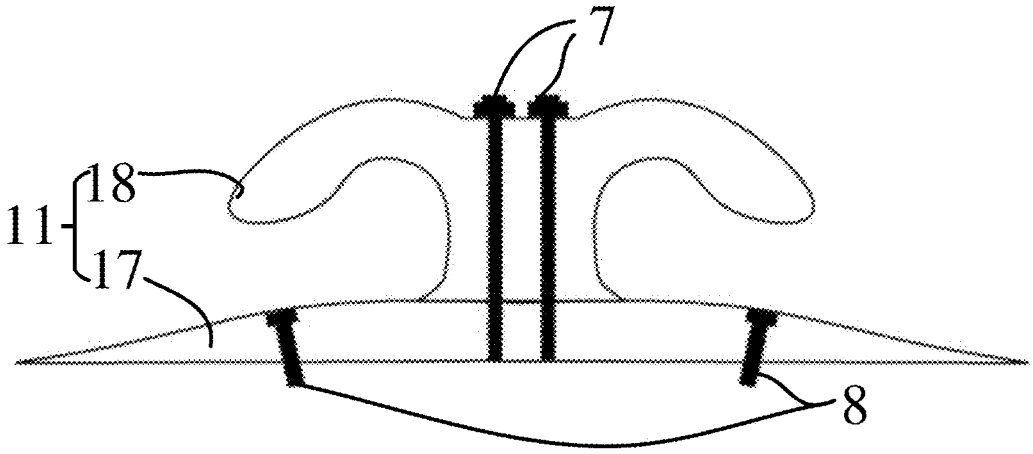
FIG. 22 is a cross-sectional view of the second foot frame bottom plate type connector involved in the dome sealing lining structure of the foot frame type underground rock lining chamber provided in the embodiment of the present invention.
Figure 23:
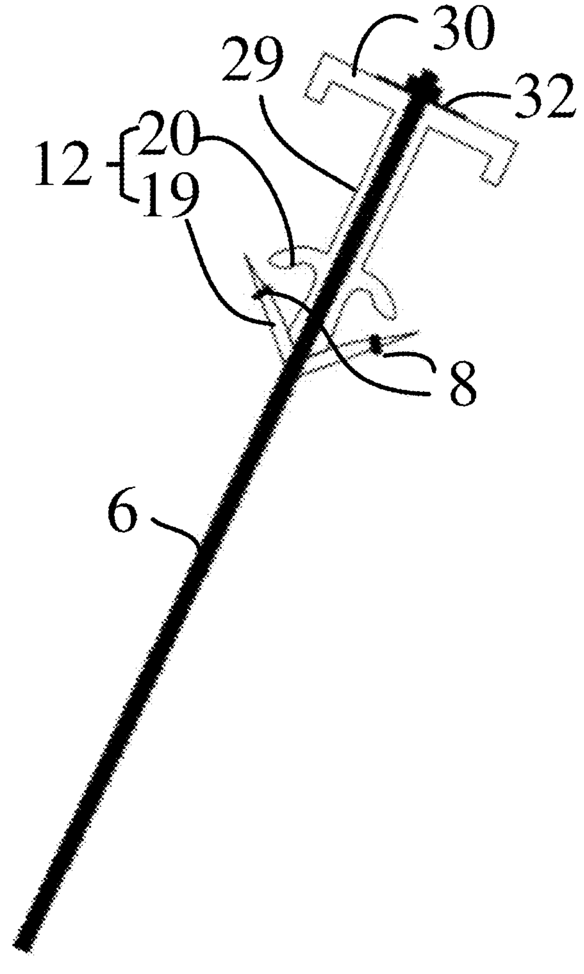
FIG. 23 is a cross-sectional view of the third leg bottom plate type connector involved in the dome sealing lining structure of the footrest type underground rock lining cave provided in the embodiment of the present invention.
Figure 24:
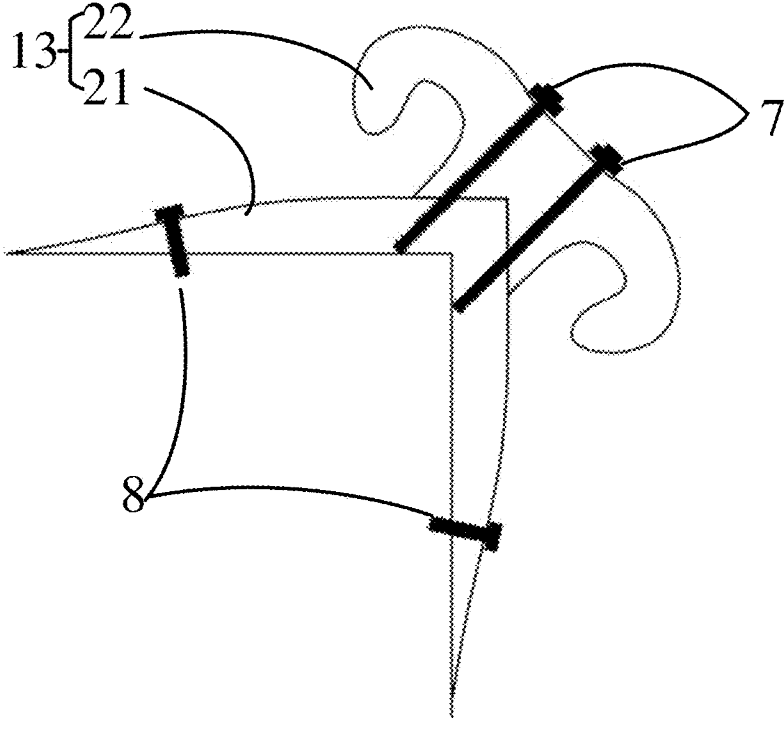
FIG. 24 is a cross-sectional view of the fourth tripod bottom plate type connector involved in the dome sealing lining structure of the tripod type underground rock lining chamber provided in the embodiment of the present invention.
Figure 25:
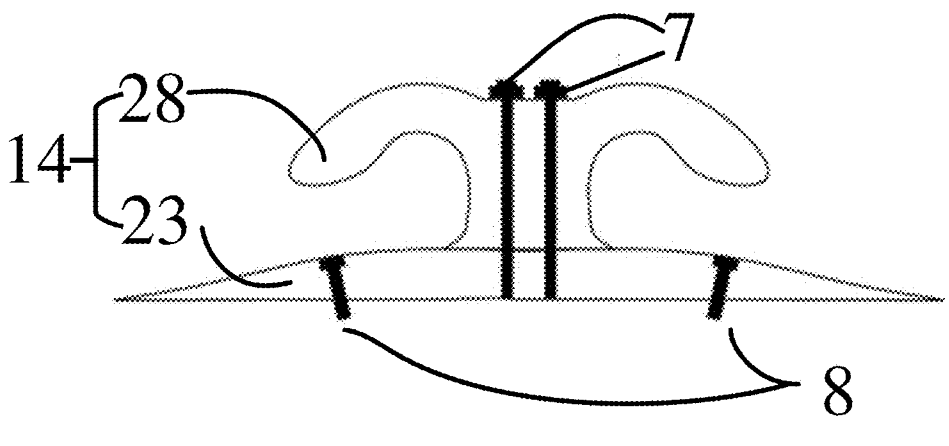
FIG. 25 is a cross-sectional view of the fifth leg bottom plate type connector involved in the dome sealing lining structure of the footrest type underground rock lining chamber provided in the embodiment of the present invention.
Figure 26:
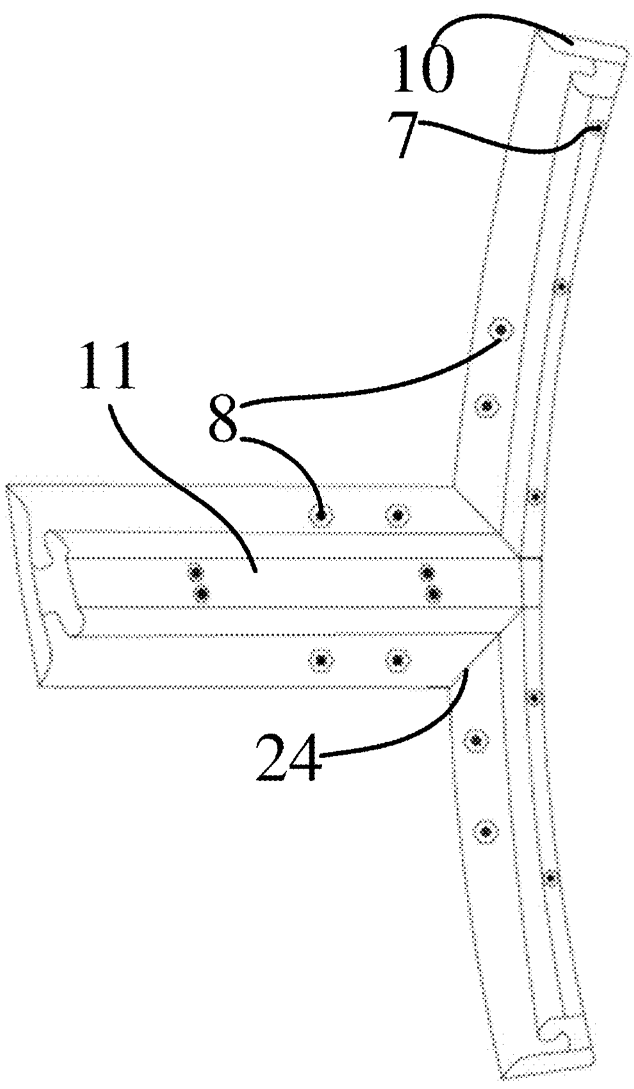
FIG. 26 is a cross-sectional view of the connection between the annular steel skeleton and the arc-shaped skeleton in the dome sealing lining structure of the footrest type underground rock lining cave provided in the embodiment of the present invention.

In view of this, the present invention provides a foot frame bottom plate shaped fixed component 2, a sealed inner lining structure, an underground chamber, and a construction method. The foot frame bottom plate shaped fixed component 2 can be combined to form a sealed inner lining structure for construction of the underground chamber, so that the inner wall of the underground chamber forms the sealed inner lining structure, which can significantly enhance the sealing performance of the underground chamber, and is more suitable for practical use.

After arduous and extraordinary efforts, the inventor discovered that,

The traditional design approach is to use steel plates as sealing materials, but the cost of steel plate sealing is high, the insulation performance of the tunnel is good, and the duration of high-temperature load is long. Research has shown that rubber materials have the basic conditions for application in the sealing layer of high-pressure gas storage chambers, with low unit cost, good mechanical and sealing properties. However, traditional rubber gas storage materials are made as a whole structure at the factory, making installation in underground gas storage chambers very difficult. How to design a combination sealing lining structure that is easy to install and can ensure sealing performance has become an urgent problem to be solved.

In order to further elaborate on the technical means and effects adopted by the present invention to achieve the predetermined invention purpose, the following is a detailed explanation of the specific implementation method, structure, features, and effects of the foot frame bottom plate type fixed part 2, sealing inner lining structure, underground chamber, and construction method proposed based on the present invention, combined with the accompanying drawings and preferred embodiments, as follows. In the following explanation, different "embodiments" or "embodiments" may not necessarily refer to the same embodiment. In addition, specific features, structures, or features in one or more embodiments may be combined in any suitable form.

The term "and/or" in this article is only a description of the association relationship between related objects, indicating that there can be three types of relationships, such as A and/or B. It can be understood as: it can contain both A and B, can exist alone A, can exist alone B, and can have any of the three situations mentioned above.

Foot Frame Bottom Plate Type Fixed Part

Referring to FIGS. 1 to 6, the foot rest bottom plate shaped shaping member 2 provided in the embodiment of the present invention is in a circular shape, and the foot rest bottom plate shaped shaping member 2 includes a fixed bottom plate 7 and an umbrella shaped foot rest 8. After cutting and unfolding the foot rest bottom plate shaped shaping member 2 along the axis direction, the fixed bottom plate 7 has a length direction and a width direction, the umbrella shaped foot rest 8 has a length direction and a width direction, and the umbrella shaped foot rest 8 is provided with a connecting part and an umbrella shaped part. The umbrella shaped part is set at the top of the connecting part, so that the umbrella shaped part faces the connecting part and has protrusions on both sides of the length direction of the umbrella shaped foot rest 8. The umbrella shaped foot rest 8 uses its connecting part to fix and connect to the fixed bottom plate 7 along the length direction of the fixed bottom plate 7, so that The umbrella shaped part of the umbrella shaped tripod 8 forms a semi open containment space clamp between the umbrella shaped part and the fixed bottom plate 7, The height of the connecting part of the semi open storage space near the umbrella shaped tripod 8 is h1, and the height of the open side of the semi open storage space near the umbrella shaped tripod 8 is h2, with h1>h2.

The foot rest bottom plate shaped fixed part 2 provided in the embodiment of the present invention can be embedded with an airtight layer 3 through the semi open capacity space clamp formed by it. Since the height of the semi open capacity space near the connection part of the umbrella shaped foot rest is greater than the height of the semi open capacity space near the open side position of the umbrella shaped foot rest, it is possible to use the outer edge of the bulk foot rest 8 to form a fitting between the airtight layer 3, thereby avoiding the displacement or detachment of the airtight layer 3 and ensuring airtightness. Therefore, it is formed inside the concrete lining layer 1 of the underground chamber. Its construction period is shorter than that of welded steel plates, the cost is lower, it has good sealing performance, and the replacement of components is convenient and easier to maintain. On the premise of ensuring tightness, the airtightness can meet the usage requirements. Due to the circular shape of the bottom plate shaped fixed part 2 of the tripod, it can ensure that the indoor lining of the underground tunnel is always circular and isotropic. In addition, the airtight layer 3 has a short construction period, and the components can be prefabricated. Compared to the traditional steel plate lining that requires on-site welding, it can save a lot of time and cost lower. During maintenance, the damaged parts can be directly replaced.

Among them, the connecting part of the umbrella shaped tripod 8 is integrated with the umbrella shaped part. In this case, there is no connection joint between the connecting part and the umbrella shaped part, which can avoid stress concentration and prolong the service life of the umbrella shaped tripod 8.

Among them, the umbrella shaped tripod 8 is fixedly connected to the fixed bottom plate 7 by fastening bolts, or the umbrella shaped tripod 8 is integrally formed with the fixed bottom plate 7. In this case, there is no connection joint between the umbrella shaped tripod 8 and the fixed base plate 7, which can avoid stress concentration and prolong the service life of the tripod base plate shaped fixed part 2 provided in the embodiment of the present invention.

Among them, the base plate type fixed part 2 of the tripod is made of corrosion-resistant steel. Iron carbon alloys with a carbon content of less than 2.11%, excluding impurities such as iron, carbon, and silicon, manganese, phosphorus, sulfur within the limit, and without other alloying elements. The carbon content of industrial carbon steel is generally between 0.05% and 1.35%. The performance of corrosion-resistant steel mainly depends on its carbon content. As the carbon content increases, the strength and hardness of the steel increase, while plasticity, toughness, and weldability decrease. Compared with other types of steel, corrosion-resistant steel is the earliest to be used, with low cost, wide performance range, and the largest usage. Suitable for media such as water, steam, air, hydrogen, ammonia, nitrogen, and petroleum products with a nominal pressure of PN≤32.0 MPa and a temperature range of −30-425° C. Commonly used grades include WC1, WCB, ZG25, high-quality steel 20, 25, 30, and low alloy structural steel 16 Mn. Therefore, the application of corrosion-resistant steel in the embodiment of the invention can improve the strength of the foot stand bottom plate shaped fixed part 2.

Among them, the circular shaped tripod base plate shaped shaping part 2 is integrally formed, or the tripod base plate shaped shaping part 2 includes multiple tripod base plate shaped shaping components, which are docked and assembled from the width direction to form a circular shaped tripod base plate shaped shaping part 2. When the ring-shaped tripod base plate shaped fixed part 2 is formed as a whole without connecting joints, it can not only avoid stress concentration but also prevent fracture from the connecting joints, which can improve the service life of the ring-shaped tripod base plate shaped fixed part 2; When the circular foot frame bottom plate shaped fixed part 2 is formed by multiple foot frame bottom plate shaped fixed components docking and assembling from the width direction, it is more convenient to assemble it on the inner wall of the underground chamber. In practice, choices can be made based on needs.

Sealing Lining Structure

The sealing inner lining structure provided by the present invention includes an airtight layer 3 and at least one foot rest bottom plate shaped shaping member 2 provided by the present invention. The airtight layer 3 is set on the foot rest bottom plate shaped fixed part 2 through a clamp with a semi open storage space.

The foot rest bottom plate shaped fixed part 2 provided in the embodiment of the present invention can be embedded with an airtight layer 3 through the semi open capacity space clamp formed by it. Since the height of the semi open capacity space near the connection part of the umbrella shaped foot rest is greater than the height of the semi open capacity space near the open side position of the umbrella shaped foot rest, it is possible to use the outer edge of the bulk foot rest 8 to form a fitting between the airtight layer 3, thereby avoiding the displacement or detachment of the airtight layer 3 and ensuring airtightness. Therefore, it is formed inside the concrete lining layer 1 of the underground chamber. Its construction period is shorter than that of welded steel plates, the cost is lower, it has good sealing performance, and the replacement of components is convenient and easier to maintain. On the premise of ensuring tightness, the airtightness can meet the usage requirements. Due to the circular shape of the bottom plate shaped fixed part 2 of the tripod, it can ensure that the indoor lining of the underground tunnel is always circular and isotropic. In addition, the airtight layer 3 has a short construction period, and the components can be prefabricated. Compared to the traditional steel plate lining that requires on-site welding, it can save a lot of time and cost lower. During maintenance, the damaged parts can be directly replaced.

Among them, the airtight layer 3 is made of a material that can deform under pressure. In this case, the compressible and deformable characteristics of the airtight layer 3 can be utilized to enhance the stability of the fitting between the foot rest bottom plate shaped fixed part 2 and the airtight layer 3.

Among them, the edge of the airtight layer 5 is equipped with a fitting part that is embedded with the semi open storage space clamp, and the airtight layer 5 is set on the foot frame bottom plate shaped fixed part 2 through the fitting part. In this embodiment, the fitting part can be a protrusion that is compatible with a semi open storage space clamp, which can improve the compatibility between the airtight layer 3 and the foot rest bottom plate shaped part 2.

Among them, the sealing inner lining structure is a sealing inner lining structure set on the cylindrical inner wall, and the foot frame bottom plate shaped fixed part 2 includes multiple. The center of the circular bottom plate shaped fixed part with multiple legs in a circular shape is coaxial, and the multiple circular bottom plate shaped fixed parts 2 of the legs are connected to one body through the airtight layer (3); The airtight layer 3 is connected to the foot rest bottom plate shaped fixed part 2 through a clamp with a semi open storage space, making the sealing inner lining structure a cylindrical sealing inner lining structure. In this case, the airtight layer 3 is set between multiple circular foot rest bottom plate shaped fixed parts 2 to form a hollow. As the multiple directions of the airtight layer 3 are embedded with the foot rest bottom plate shaped fixed parts 2, it can avoid the displacement of the airtight layer 3 between the foot rest bottom plate shaped fixed parts 2, further ensuring the airtightness of the sealing inner lining structure formed by it. In addition, multiple circular foot frame bottom plate shaped fixed parts 2 are equivalent to having multiple ribs, which can ensure their own strength. Therefore, they can reduce the possibility of deformation of the sealing inner lining structure and extend the service life.

Among them, multiple annular shaped foot rest bottom plate shaped fixed parts 2 are uniformly arranged along the axial direction of the cylindrical sealing inner lining mechanism. In this case, the sealing inner lining formed by it is uniformly stressed, and setting it in the underground chamber can extend the service life of the underground chamber provided in the embodiments of the present invention.

Underground Chamber

The underground chamber provided by the present invention includes a concrete lining layer 1 and a sealed lining structure provided by the present invention. The inner wall of concrete lining layer 1 is cylindrical, and the sealed inner lining structure is fixed on the inner wall of concrete lining layer 1 through the fixed bottom plate 7 of the foot frame bottom plate shaped shaping component 2.

The foot rest bottom plate shaped fixed part 2 provided in the embodiment of the present invention can be embedded with an airtight layer 3 through the semi open capacity space clamp formed by it. Since the height of the semi open capacity space near the connection part of the umbrella shaped foot rest is greater than the height of the semi open capacity space near the open side position of the umbrella shaped foot rest, it is possible to use the outer edge of the bulk foot rest 8 to form a fitting between the airtight layer 3, thereby avoiding the displacement or detachment of the airtight layer 3 and ensuring airtightness. Therefore, it is formed inside the concrete lining layer 1 of the underground chamber. Its construction period is shorter than that of welded steel plates, the cost is lower, it has good sealing performance, and the replacement of components is convenient and easier to maintain. On the premise of ensuring tightness, the airtightness can meet the usage requirements. Due to the circular shape of the bottom plate shaped fixed part 2 of the tripod, it can ensure that the indoor lining of the underground tunnel is always circular and isotropic. In addition, the airtight layer 3 has a short construction period, and the components can be prefabricated. Compared to the traditional steel plate lining that requires on-site welding, it can save a lot of time and cost lower. During maintenance, the damaged parts can be directly replaced.

Construction Methods for Underground Chambers

The construction method of the underground chamber provided by the present invention includes the following steps:

According to the inner diameter of the underground chamber, a circular foot frame bottom plate shaped fixed part 2 is fixedly arranged on the inner wall of the underground chamber, so that the outer diameter of the circular foot frame bottom plate shaped fixed part 2 matches the inner diameter of the underground chamber;

The airtight layer 3 is embedded in the annular footrest bottom plate shaped fixed part 2 through a semi open capacity space clamp, so that the inner wall of the underground chamber forms the sealing inner lining structure provided by the present invention.

The foot rest bottom plate shaped fixed part 2 provided in the embodiment of the present invention can be embedded with an airtight layer 3 through the semi open capacity space clamp formed by it. Since the height of the semi open capacity space near the connection part of the umbrella shaped foot rest is greater than the height of the semi open capacity space near the open side position of the umbrella shaped foot rest, it is possible to use the outer edge of the bulk foot rest 8 to form a fitting between the airtight layer 3, thereby avoiding the displacement or detachment of the airtight layer 3 and ensuring airtightness. Therefore, it is formed inside the concrete lining layer 1 of the underground chamber. Its construction period is shorter than that of welded steel plates, the cost is lower, it has good sealing performance, and the replacement of components is convenient and easier to maintain. On the premise of ensuring tightness, the airtightness can meet the usage requirements. Due to the circular shape of the bottom plate shaped fixed part 2 of the tripod, it can ensure that the indoor lining of the underground tunnel is always circular and isotropic. In addition, the airtight layer 3 has a short construction period, and the components can be prefabricated. Compared to the traditional steel plate lining that requires on-site welding, it can save a lot of time and cost lower. During maintenance, the damaged parts can be directly replaced.

Among them, according to the inner diameter of the underground chamber, a circular foot frame bottom plate shaped fixed part 2 is fixedly arranged on the inner wall of the underground chamber, so that the circular foot frame bottom plate shaped fixed part 2 is compatible with the inner wall of the underground chamber, including the following steps:

Drill the first type of connecting hole on the inner wall of the underground chamber;

Adjust the position of the foot frame bottom plate fixed part 2 so that the second connection hole of the foot frame bottom plate fixed part 2 corresponds to the position of the first connection hole on the inner wall of the underground chamber;

Screw the locking bolt 5 into both the first and second connection holes simultaneously, so that the foot frame bottom plate fixed part 2 is fixed to the inner wall of the underground chamber.

In this case, the sealing lining structure can be stably fixed on the inner wall of the concrete lining layer 1 of the underground chamber through the first connection hole, the second connection hole, and the tightening bolt 5, and the cost is low.

Among them, after embedding the airtight layer 3 into the hollow through a semi open capacity space clip, forming the sealing inner lining structure provided by the present invention on the inner wall of the underground chamber, the following steps are also included:

Conduct gas storage tests on underground chambers to determine their sealing performance;

Real time monitoring of possible air leakage points in underground tunnels.

In this case, real-time monitoring of possible leakage points in the underground chamber can be carried out, and once a leakage occurs, it can be promptly known and remedied.

During the process of real-time monitoring of possible air leakage points in the underground chamber, the possible air leakage points include: the connection between the airtight layer 3 and the foot frame bottom plate fixed part 2, the connection between the foot frame bottom plate fixed part 2 and the umbrella shaped part, the connection between the fixed bottom frame of the foot frame bottom plate fixed part 2 and the inner wall of the underground chamber, and one or more parts of the airtight layer 3 itself. In this case, real-time monitoring can be accurately carried out for possible air leakage points in underground tunnels.

Among them, real-time monitoring of possible air leakage points in underground tunnels includes the following steps:

Install gas flow monitoring instruments at potential leakage points in underground tunnels, and set location labels for each gas flow monitoring instrument;

Set an alarm threshold for the gas flow monitoring instrument based on its location;

When an abnormal gas flow alarm occurs, determine the location of the leakage point in the underground chamber based on the location label of the gas flow monitoring instrument that triggered the alarm.

In this case, once a possible leakage point in the underground chamber occurs, the leakage point in the underground chamber can be accurately determined based on the alarm information and the location label of the gas flow monitoring instrument, and emergency repair measures can be taken.

Foot Frame Base Type Skeleton

Referring to FIGS. 9 to 14, the footrest bottom frame provided in the embodiments of the present invention includes a fixed bottom plate 10 and an umbrella shaped footrest 11. The fixed base plate 10 has a length direction and a width direction, and the umbrella shaped foot frame 11 has a length direction and a width direction. The umbrella shaped foot frame 11 is equipped with a connecting part and an umbrella shaped part. The umbrella shaped part is set at the top of the connecting part, so that the umbrella shaped part faces the connecting part and has protrusions on both sides of the length direction of the umbrella shaped foot frame 11. The umbrella shaped foot frame 11 uses its connecting part to fixedly connect to the fixed base plate 10 along the length direction of the fixed base plate 10, so that a semi open containment space clamp is formed between the umbrella shaped part of the umbrella shaped foot frame 11 and the fixed base plate 10. The height of the semi open containment space close to the connecting part of the umbrella shaped foot frame 11 is h1, and the semi open containment space is close to the umbrella shaped storage space. The height of the open side position of tripod 11 is h2, where h1 is greater than h2.

The foot frame bottom plate type skeleton provided in the embodiment of the present invention can be embedded with an airtight layer 3 through the semi open storage space clamp formed by it. Among them, since the height of the semi open storage space near the connection part of the umbrella shaped foot frame is greater than the height of the semi open storage space near the open side position of the umbrella shaped foot frame, it is possible to use the outer edge of the bulk foot frame 11 to form a fit between the airtight layer 3, thereby avoiding the displacement or detachment of the airtight layer 3 and ensuring airtightness. Therefore, it is formed on the inner side of the concrete lining layer 1 of the underground gas storage. Its construction period is shorter than that of welded steel plates, the cost is lower, it has good sealing performance, and the replacement of components is convenient and easier to maintain. On the premise of ensuring tightness, the airtightness can meet the usage needs. The airtightness layer 3 has a short construction period, and the components can be prefabricated. Compared with the disadvantage of traditional steel plate lining that requires on-site welding, it can save a lot of construction time, and the cost will also be lower. During maintenance, the damaged parts can be directly replaced.

Among them, the connecting part of the umbrella shaped tripod 11 is integrated with the umbrella shaped part. In this case, there is no connection joint between the connecting part and the umbrella shaped part, which can avoid stress concentration and prolong the service life of the umbrella shaped tripod 11.

Among them, the umbrella shaped tripod 11 is fixedly connected to the fixed bottom plate 10 by fastening bolts, or the umbrella shaped tripod 11 is integrally formed with the fixed bottom plate 10. In this case, there is no connection joint between the umbrella shaped tripod 11 and the fixed bottom plate 10, which can avoid stress concentration and prolong the service life of the tripod bottom plate skeleton provided in the embodiments of the present invention.

Among them, the bottom frame of the tripod is made of corrosion-resistant steel. Iron carbon alloys with a carbon content of less than 2.11%, excluding impurities such as iron, carbon, and silicon, manganese, phosphorus, sulfur within the limit, and without other alloying elements. The carbon content of industrial carbon steel is generally between 0.05% and 1.35%. The performance of corrosion-resistant steel mainly depends on its carbon content. As the carbon content increases, the strength and hardness of the steel increase, while plasticity, toughness, and weldability decrease. Compared with other types of steel, corrosion-resistant steel is the earliest to be used, with low cost, wide performance range, and the largest usage. Suitable for media such as water, steam, air, hydrogen, ammonia, nitrogen, and petroleum products with a nominal pressure of PN≤32.0 MPa and a temperature range of −30-425° C. Commonly used grades include WC1, WCB, ZG25, high-quality steel 20, 25, 30, and low alloy structural steel 16 Mn. Therefore, the use of corrosion-resistant steel as the base plate type skeleton provided in the embodiments of the invention can improve the strength of the base plate type skeleton.

Sealing Lining Structure

The sealing inner lining structure provided by the present invention includes an airtight layer 3 and at least one footrest bottom plate type skeleton provided by the present invention. The airtight layer 3 is set on the bottom frame of the tripod through a clamp with a semi open storage space.

The foot frame bottom plate type skeleton provided in the embodiment of the present invention can be embedded with an airtight layer 3 through the semi open storage space clamp formed by it. Among them, since the height of the semi open storage space near the connection part of the umbrella shaped foot frame is greater than the height of the semi open storage space near the open side position of the umbrella shaped foot frame, it is possible to use the outer edge of the bulk foot frame 11 to form a fit between the airtight layer 3, thereby avoiding the displacement or detachment of the airtight layer 3 and ensuring airtightness. Therefore, it is formed on the inner side of the concrete lining layer 1 of the underground gas storage. Its construction period is shorter than that of welded steel plates, the cost is lower, it has good sealing performance, and the replacement of components is convenient and easier to maintain. On the premise of ensuring tightness, the airtightness can meet the usage needs. The airtightness layer 3 has a short construction period, and the components can be prefabricated. Compared with the disadvantage of traditional steel plate lining that requires on-site welding, it can save a lot of construction time, and the cost will also be lower. During maintenance, the damaged parts can be directly replaced.

Among them, the airtight layer 3 is made of a material that can deform under pressure. In this case, the compressibility and deformability of the airtight layer 3 can be utilized to enhance the stability of the fit between the footrest bottom frame and the airtight layer 3.

Among them, the edge of the airtight layer 3 is equipped with a fitting part that is embedded with the opening of the semi open storage space, and the airtight layer 3 is set on the foot frame bottom plate type skeleton through the fitting part. In this embodiment, the embedding part can be a protrusion that is adapted to a semi open capacity space clamp, which can improve the compatibility between the airtight layer 3 and the foot frame bottom plate type skeleton.

Among them, the tripod base type skeleton includes multiple. Multiple tripod base type skeletons are arranged vertically and horizontally in a staggered manner, forming a hollow between the multiple tripod base type skeletons; The airtight layer 3 is set inside the hollow through a clamp with a semi open storage space. In this case, the airtight layer 3 is set between multiple foot frame bottom type skeletons to form a hollow. Due to the multiple orientations of the airtight layer 3 being embedded with the foot frame bottom type skeleton, it can avoid the displacement of the airtight layer 3 within the hollow of the foot frame bottom type skeleton, further ensuring the airtightness of the sealing lining structure formed by it.

Among them, the sealed inner lining structure is a sealed inner lining structure set on the cylindrical inner wall. The tripod bottom plate type skeleton includes multiple axial skeletons and multiple circumferential skeletons, which are connected in a crisscross manner, forming a hollow between the multiple tripod bottom plate type skeletons; The airtight layer 3 is set inside the hollow through a clamp with a semi open storage space. In this case, the footrest bottom plate type skeleton is equivalent to having multiple ribs, which can ensure its own strength. At the same time, the footrest bottom plate type skeleton forms more hollows between them, which can further ensure the airtightness of the sealed inner lining structure formed by it by setting an airtight layer 3 inside.

Among them, multiple axial skeletons and multiple circumferential skeletons are uniformly arranged. In this case, the sealing inner lining formed by it is uniformly stressed, and setting it in the underground gas storage can prolong the service life of the underground gas storage provided in the embodiments of the present invention.

Underground Gas Storage

The underground gas storage provided by the present invention includes a concrete lining layer 1 and a sealed lining structure provided by the present invention. The inner wall of concrete lining layer 1 is cylindrical, and the sealing lining structure is fixed on the inner wall of concrete lining layer 1 through the fixed bottom plate 10 of the foot frame bottom plate type skeleton.

The foot frame bottom plate type skeleton provided in the embodiment of the present invention can be embedded with an airtight layer 3 through the semi open storage space clamp formed by it. Among them, since the height of the semi open storage space near the connection part of the umbrella shaped foot frame is greater than the height of the semi open storage space near the open side position of the umbrella shaped foot frame, it is possible to use the outer edge of the bulk foot frame 11 to form a fit between the airtight layer 3, thereby avoiding the displacement or detachment of the airtight layer 3 and ensuring airtightness. Therefore, it is formed on the inner side of the concrete lining layer 1 of the underground gas storage. Its construction period is shorter than that of welded steel plates, the cost is lower, it has good sealing performance, and the replacement of components is convenient and easier to maintain. On the premise of ensuring tightness, the airtightness can meet the usage needs. The airtightness layer 3 has a short construction period, and the components can be prefabricated. Compared with the disadvantage of traditional steel plate lining that requires on-site welding, it can save a lot of construction time, and the cost will also be lower. During maintenance, the damaged parts can be directly replaced.

The construction method of the underground gas storage provided by the present invention includes the following steps:

Construction Methods for Underground Gas Storage Facilities

According to the inner diameter of the underground gas storage, assemble a foot frame bottom plate type skeleton, which includes multiple axial skeletons and multiple circumferential skeletons. The multiple axial skeletons and circumferential skeletons are connected vertically and horizontally, forming a hollow between the multiple foot frame bottom plate type skeletons;

Lay the tripod bottom plate skeleton onto the inner wall of the underground gas storage, and fix the tripod bottom plate skeleton to the inner wall of the underground gas storage;

The airtight layer 3 is embedded in the hollow through a semi open capacity space clip, so that the inner wall of the underground gas storage tank forms the sealing inner lining structure provided by the present invention.

The foot frame bottom plate type skeleton provided in the embodiment of the present invention can be embedded with an airtight layer 3 through the semi open storage space clamp formed by it. Among them, since the height of the semi open storage space near the connection part of the umbrella shaped foot frame is greater than the height of the semi open storage space near the open side position of the umbrella shaped foot frame, it is possible to use the outer edge of the bulk foot frame 11 to form a fit between the airtight layer 3, thereby avoiding the displacement or detachment of the airtight layer 3 and ensuring airtightness. Therefore, it is formed on the inner side of the concrete lining layer 1 of the underground gas storage. Its construction period is shorter than that of welded steel plates, the cost is lower, it has good sealing performance, and the replacement of components is convenient and easier to maintain. On the premise of ensuring tightness, the airtightness can meet the usage needs. The airtightness layer 3 has a short construction period, and the components can be prefabricated. Compared with the disadvantage of traditional steel plate lining that requires on-site welding, it can save a lot of construction time, and the cost will also be lower. During maintenance, the damaged parts can be directly replaced.

Among them, laying the foot frame bottom plate skeleton to the inner wall of the underground gas storage, and fixing the foot frame bottom plate skeleton to the inner wall of the underground gas storage, specifically including the following steps:

Drill the first type of connecting hole on the inner wall of the underground gas storage facility;

Adjust the position of the tripod base plate skeleton so that the second connection hole of the tripod base plate skeleton corresponds to the position of the first connection hole on the inner wall of the underground gas storage facility;

Screw the fastening bolts into both the first and second connection holes simultaneously, so that the base plate type framework of the tripod is fixed to the inner wall of the underground gas storage.

In this case, the sealing lining structure can be stably fixed on the inner wall of the concrete lining layer 1 of the underground gas storage through the first connection hole, the second connection hole, and the fastening bolt, and the cost is low.

Among them, after embedding the airtight layer 3 into the hollow through a semi open capacity space clip, forming the sealing inner lining structure provided by the present invention on the inner wall of the underground gas storage, the following steps are also included:

Conduct gas storage tests on underground gas storage facilities to determine their sealing performance;

Real time monitoring of potential leakage points in underground gas storage facilities.

In this case, real-time monitoring of possible leak points in underground gas storage can be carried out, and once a leak occurs, it can be promptly identified and remedied.

In the process of real-time monitoring of possible leakage points in underground gas storage, the possible leakage points include: the connection between airtight layer 3 and the foot frame bottom plate skeleton, the connection between the foot frame bottom plate skeleton and the umbrella shaped part, the connection between the fixed bottom frame of the foot frame bottom plate skeleton and the inner wall of the underground gas storage, and one or more parts of airtight layer 3 itself. In this case, it is possible to accurately monitor the possible leakage points of underground gas storage in real-time.

Among them, real-time monitoring of possible leakage points in underground gas storage facilities includes the following steps:

Install gas flow monitoring instruments at potential leak points in underground gas storage facilities, and set location labels for each gas flow monitoring instrument;

Set an alarm threshold for the gas flow monitoring instrument based on its location;

When an abnormal gas flow alarm occurs, determine the leakage point of the underground gas storage based on the location label of the gas flow monitoring instrument that triggered the alarm.

In this case, once a possible leakage point in the underground gas storage occurs, the leakage point of the underground gas storage can be accurately determined based on the alarm information and the location label of the gas flow monitoring instrument, and emergency repair measures can be taken.

Dome Sealed Inner Lining Structure of a Tripod Type Underground Rock Lined Cavern Referring to FIGS. 15 to 26, an embodiment of the present invention provides a dome sealed inner lining structure for a tripod type underground rock lining cavern. The tripod type underground rock lining cavern is set inside the surrounding rock 25, and a concrete lining layer 1 is set between the tripod type underground rock lining cavern and the surrounding rock 25. Among them, the dome sealing inner lining structure of the footrest underground rock lining chamber includes a dome skeleton 3, a columnar skeleton 26, a fan ring airtight layer 4, and a columnar ring airtight layer 27. The dome skeleton 3 and the columnar skeleton 26 respectively provide footrest bottom plate type connectors. The columnar skeleton 26 is fixedly connected to the bottom of the dome skeleton 3 through a foot rest bottom plate type connector; The fan ring airtight layer 4 is fixedly connected between the dome skeleton 3 through a foot frame bottom plate connector, and the column ring airtight layer 27 is fixedly connected between the column skeleton 26 through a foot frame bottom plate connector, so that the fan ring airtight layer 4 and the column ring airtight layer 27 together form the dome sealing lining structure of the underground rock lining cavern.

The construction process of the dome sealed inner lining structure of the foot frame type underground rock lined cavern provided by the embodiment of the present invention does not require the provision of an overall sealed inner lining structure in the concrete lining layer 1. Instead, a skeleton is first laid out in the concrete lining layer 1, and the airtight layer is connected between the skeletons, ultimately forming the dome sealed inner lining structure of the underground rock lined cavern. Compared to the overall sealing layer, the installation is more convenient, the work efficiency is higher, and the cost is lower.

Among them, the dome skeleton 3 includes a spherical shell plate 9, a circular skeleton 10, multiple arc-shaped skeletons 11, an outer ring skeleton 12, an inner ring skeleton 13, a radial skeleton 14, and a circular platform 2. The inner diameter of the annular skeleton 10 is equal to the diameter of the spherical shell plate 9, and the annular skeleton 10 is fixed at the outer ring of the spherical shell plate 9. The diameter of outer ring skeleton 12 is greater than that of inner ring skeleton 13, and the diameter of inner ring skeleton 13 is greater than that of spherical shell plate 9. One end of the arc-shaped skeleton 11 is fixedly connected to the annular skeleton 10, and the other end of the arc-shaped skeleton 11 is fixedly connected to the outer ring skeleton 12. One end of the radial skeleton 14 is fixedly connected to the outer ring skeleton 12, and the other end of the radial skeleton 14 is fixedly connected to the inner ring skeleton 13, forming a circular belt between the outer ring skeleton 12 and the inner ring skeleton 13. Circular platform 2 is located within the circular belt, wherein it is fixedly connected between the outer ring skeleton 12, the inner ring skeleton 13, and the radial skeleton 14 through a foot rest bottom plate type connector. One end of the columnar skeleton 26 is fixedly connected to the inner ring skeleton 13. The spherical plate 9 is sealed in the construction shaft. In this case, the dome skeleton 3 is easy to form, and the connection reliability is high when connected to the dome skeleton 3 using foot rest bottom plate connectors.

Among them, the tripod base plate type connector includes the first tripod base plate type connector, the second tripod base plate type connector, the third tripod base plate type connector, the fourth tripod base plate type connector, and the fifth tripod base plate type connector. The first tripod base plate type connector is set at the connection between the annular skeleton 10 and the fan-shaped airtight layer 4. The second tripod base plate type connector is set at the connection between the arc-shaped skeleton 11 and the fan-shaped airtight layer 4. The bottom plate type connector of the third tripod is set at the connection between the outer ring skeleton 12, the fan ring airtight layer 4, and the annular platform 2. The fourth tripod base plate type connector is set at the connection between the circular platform 2 and the column ring type airtight layer 27. The fifth tripod base plate type connector is set at the connection between the column ring type airtight layer 27 and the column shaped skeleton 26. In this case, different forms of foot rest bottom plate connectors can be set according to the specific situation of different connection parts, which has better adaptability.

Among them, the first tripod base plate type connector includes a first fixed base plate 15 and a first tripod 16. After cutting and unfolding the first tripod base plate type connector along the axis direction. The first fixed base plate 15 has a length direction and a width direction. The first tripod 16 has a length direction and a width direction. The first tripod 16 is equipped with a connecting part and a bending hook part. The bending hook part is set at the top of the connecting part, so that the bending hook part has protrusions towards the length direction of the first tripod 16 towards the connecting part. The first tripod 16 is fixedly connected to the first fixed bottom plate 15 along the length direction of the first fixed bottom plate 15 using its connecting part, so that a semi open capacity space clamp is formed between the bending hook of the first tripod 16 and the first fixed bottom plate 15. The height of the semi open capacity space near the connecting part of the first tripod 16 is h1, and the height of the semi open capacity space near the open side position of the first tripod 16 is h2, h1>h2. In this case, the fan-shaped airtight layer 4 can be connected to the annular skeleton 10 using the semi open capacity space clamp, with high connection reliability.

Among them, the second tripod base plate type connector includes a second fixed base plate 17 and a second tripod 18. After cutting and unfolding the second tripod base plate type connector along the axis direction, the cross-section of the second tripod 18 is umbrella shaped. The second fixed base plate 17 has a length direction and a width direction. The second leg 18 has a length direction and a width direction, and the second leg 18 is equipped with a connecting portion and an umbrella shaped portion. The umbrella shaped portion is set at the top of the connecting portion, so that the umbrella shaped portion has protrusions on both sides of the length direction of the second leg 18 towards the connecting portion. The second leg 18 is fixedly connected to the second fixed bottom plate 17 along the length direction of the second fixed bottom plate 17 using its connecting part, so as to form a semi open containment space clamp between the umbrella shaped part of the second leg 18 and the second fixed bottom plate 17. The height of the semi open containment space near the connecting part of the second leg 18 is h3, and the height of the semi open containment space near the open side position of the second leg 8 is h4, h3>h4. In this case, the fan-shaped airtight layer 4 can be connected to the arc-shaped skeleton 11 using the semi open capacity space clamp, with high connection reliability.

Among them, the fifth tripod base plate type connector includes the fifth fixed base plate 23 and the fifth tripod 28. After cutting and unfolding the fifth tripod base plate type connector along the axis direction, the cross-section of the fifth tripod 28 is umbrella shaped. The fifth fixed bottom plate 23 has both length and width directions. The fifth leg 28 has a length direction and a width direction, and the fifth leg 18 is equipped with a connecting portion and an umbrella shaped portion. The umbrella shaped portion is set at the top of the connecting portion, so that the umbrella shaped portion has protrusions on both sides of the length direction of the fifth leg 28 towards the connecting portion. The fifth tripod 28 is fixedly connected to the fifth fixed bottom plate 23 along the length direction of the fifth fixed bottom plate 23 using its connecting part, so as to form a semi open capacity space clamp between the umbrella shaped part of the fifth tripod 28 and the fifth fixed bottom plate 23. The height of the semi open capacity space near the connecting part of the fifth tripod 28 is h5, and the height of the semi open capacity space near the open side position of the fifth tripod 28 is h6, h5>h6. In this case, the column ring airtight layer 27 can be connected to the columnar skeleton 26 using the semi open capacity space clamp, with high connection reliability.

Among them, the fourth tripod base plate type connector includes the fourth fixed base plate 21 and the fourth tripod 22. After cutting and unfolding the fourth tripod base plate type connector along the axis direction, the cross-section of the fourth tripod 22 is umbrella shaped. From the radial section of the fourth fixed bottom plate 21, it can be observed that the fourth fixed bottom plate 21 has a folding angle facing away from the fourth tripod, forming two connecting wings at the two folding angles of the fourth fixed bottom plate 21. The fourth leg 22 has a length direction and a width direction. The fourth leg 22 is equipped with a connecting part and an umbrella shaped part, which is set at the top of the connecting part, so that the umbrella shaped part faces the connecting part and has protrusions towards the two connecting wings of the fourth leg 22. The fourth tripod 22 is fixedly connected to the fourth fixed bottom plate 22 along the length direction of the fourth fixed bottom plate 21 using its connecting part, so as to form a semi open containment space clamp between the umbrella shaped part of the fourth tripod 22 and the two connecting wings of the fourth fixed bottom plate 22. In this case, the column ring airtight layer 27 can be connected to the annular platform 2 using the semi open capacity space clamp, with high connection reliability.

Among them, the third tripod base plate type connector includes a third fixed base plate 19 and a third tripod 20. After cutting and unfolding the third tripod base plate type connector along the axis direction, the cross-section of the third tripod 20 is umbrella shaped. From the radial section of the third fixed bottom plate 19, it can be observed that the third fixed bottom plate 19 has a folding angle towards the direction close to the third tripod, forming two connecting wings at the two folding angles of the third fixed bottom plate 19. The third tripod 20 has a length direction and a width direction, and the third tripod 20 is equipped with a connecting portion and an umbrella shaped portion. The umbrella shaped portion is set at the top of the connecting portion, so that the umbrella shaped portion faces the connecting portion and has protrusions towards the two connecting wings of the third tripod 20. The third tripod 20 is fixedly connected to the third fixed bottom plate 20 along the length direction of the third fixed bottom plate 19 using its connecting part, so as to form a semi open containment space clamp between the umbrella shaped part of the third tripod 20 and the two connecting wings of the third fixed bottom plate 20. In this case, the fan-shaped airtight layer 4 and the annular platform 2 can be connected to the outer ring skeleton 12 using the semi open capacity space clamp, with high connection reliability.

Among them, the dome sealing inner lining structure of the tripod type underground rock lining cavern also includes an extension part 29 and a sliding safety lock buckle 5. The extension part 29 extends towards the distal end from the connecting part of the third leg 20. The sliding safety buckle 5 includes a first connecting part and a second connecting part. The sliding safety buckle 5 is set at the extension portion 29 through the first connecting part, so that the sliding safety buckle 5 can slide along the extension portion 29. One end of the second connecting part is fixedly connected to the first connecting part, and the other end of the second connecting part is used to externally connect accessory components. In this case, the extension 29 and the sliding safety lock 5 can be used to connect the accessory components externally. In this embodiment, the accessory components include a construction basket, making the construction process more convenient.

Among them, the dome sealing lining structure of the tripod type underground rock lining cave also includes a limiting member 30 and a roller 31. The limit member 30 is fixedly set at the end of the extension part 29. The first connecting part of the sliding safety buckle 5 is equipped with a box structure. The box structure is embedded with the limit member 30, forming a storage space between the box structure and the limit member 30. The roller 31 is set within the storage space, and the rolling direction of the roller 31 is consistent with the sliding direction of the sliding safety lock 5. In this case, using roller 31, the sliding friction force during the sliding process of sliding safety lock 5 can be converted into rolling friction force, making sliding more convenient.

Among them, the contour size of roller 31 matches the size of the storage space. In this case, it is possible to prevent the sliding safety latch 5 from tilting during the sliding process.

Among them, the dome sealing lining structure of the tripod type underground rock lining cavern also includes anchor rod 6 and gasket 32. Anchor rod 6 runs through the connecting part and extension part 29 of the third tripod 20, and is fixed with a nut to fix the other end of anchor rod 6 inside the surrounding rock 25. Shim 32 is set between the limiting member 30 and the nut, where the inner diameter of Shim 32 is greater than the diameter of anchor rod 6 but less than the inner diameter of the nut, and the outer diameter of Shim 32 is greater than the outer diameter of the nut. In this case, the connection of anchor rod 6 is more stable.

Among them, auxiliary components include construction baskets. In this case, the tools used during the construction process can be placed in the construction basket, making the construction process more convenient.

Figure 27:
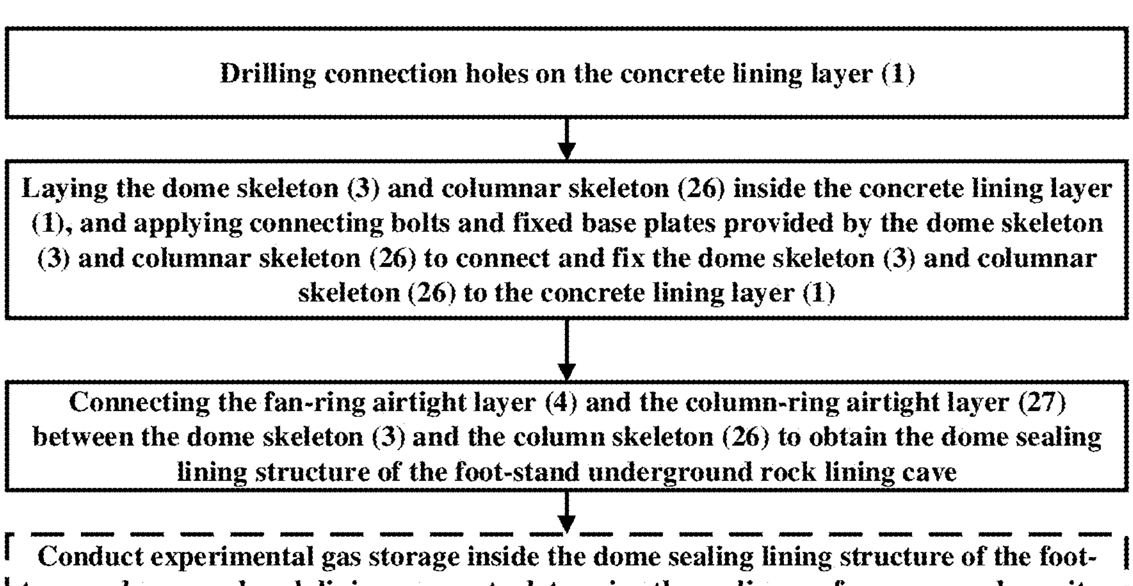
FIG. 27 is a step-by-step flowchart of the construction method for the dome sealed inner lining structure of a footrest type underground rock lining cave provided in an embodiment of the present invention.
Figure 28:
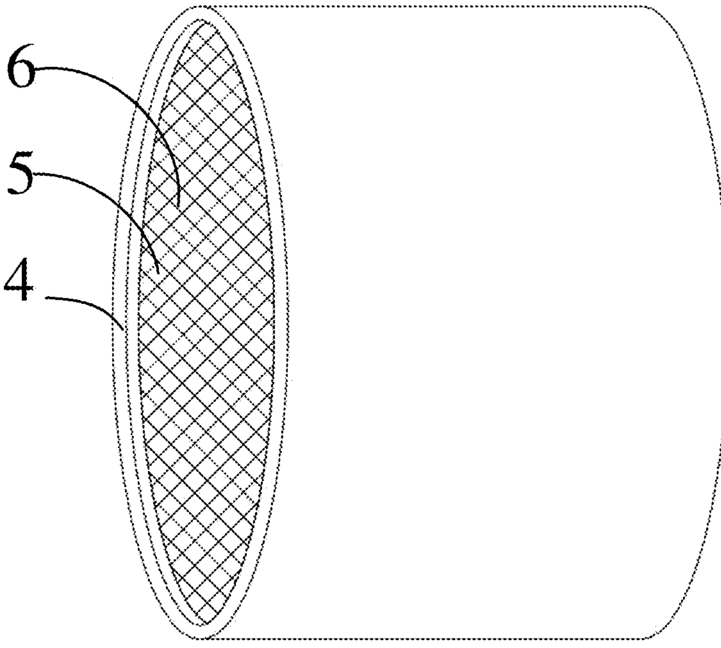
FIG. 28 is a three-dimensional structural schematic diagram of a typical direction of an underground rock gas storage cavern with an annular sealing lining provided in Example 1 of the present invention.
Figure 29:
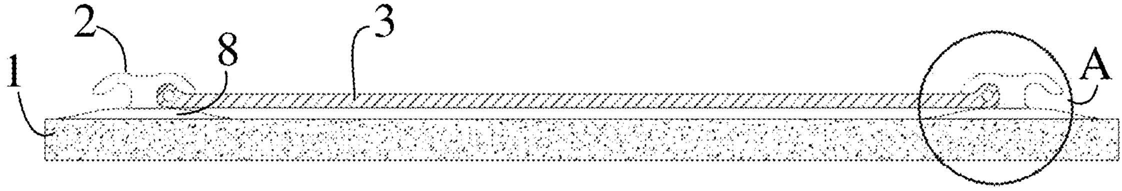
FIG. 29 is a schematic diagram of the cross-sectional structure of an underground rock gas storage cavern with an annular sealing lining provided in Example 1 of the present invention.
Figure 30:
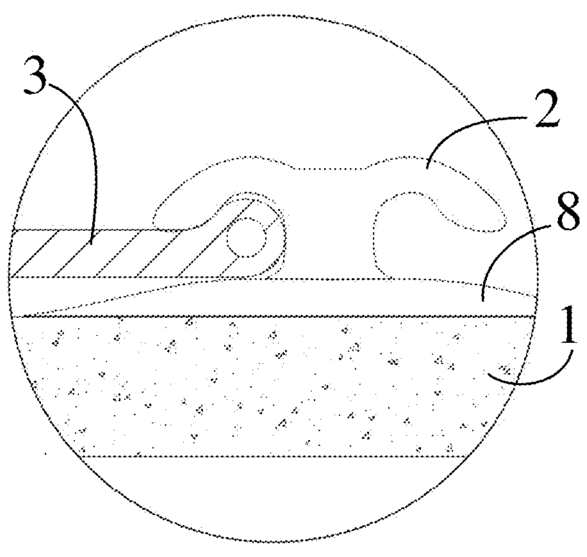
FIG. 30 is a schematic diagram of the partially enlarged structure of Part A in FIG. 29.
Figure 31:
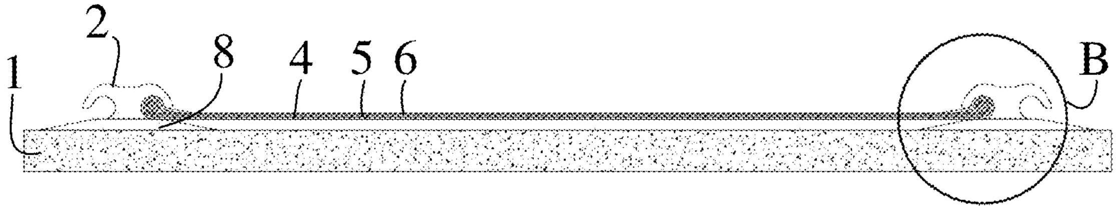
FIG. 31 is a detailed cross-sectional structure diagram of an underground rock gas storage cavern with a ring sealed inner lining provided in Example 1 of the present invention (where the curtain layer 5 is distributed throughout the entire airtight layer, and the airtight layer is in a relaxed state)
Figure 32:
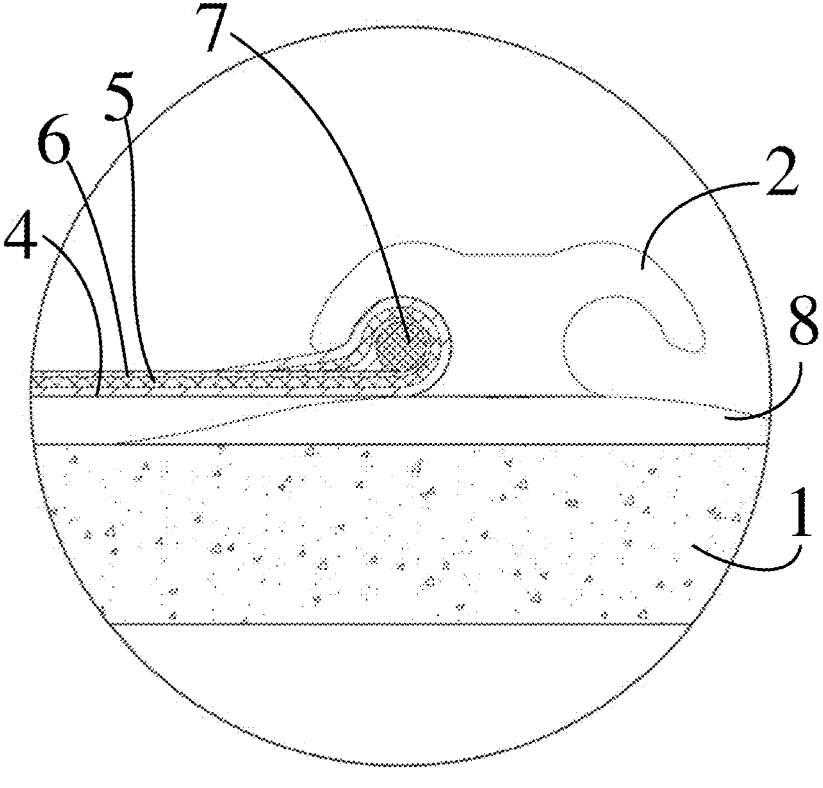
FIG. 32 is a schematic diagram of the partially enlarged structure of Part B in FIG. 31.
Figure 33:
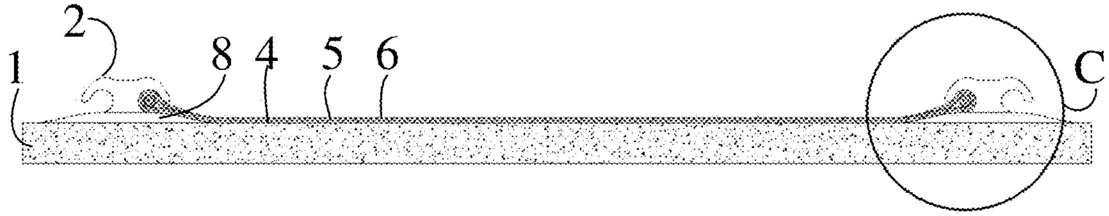
FIG. 33 is a detailed cross-sectional structure diagram of an underground rock gas storage cavern with a ring sealed inner lining provided in Example 1 of the present invention (where the curtain layer 5 is distributed throughout the entire airtight layer, and the airtight layer is in an inflated state)
Figure 34:
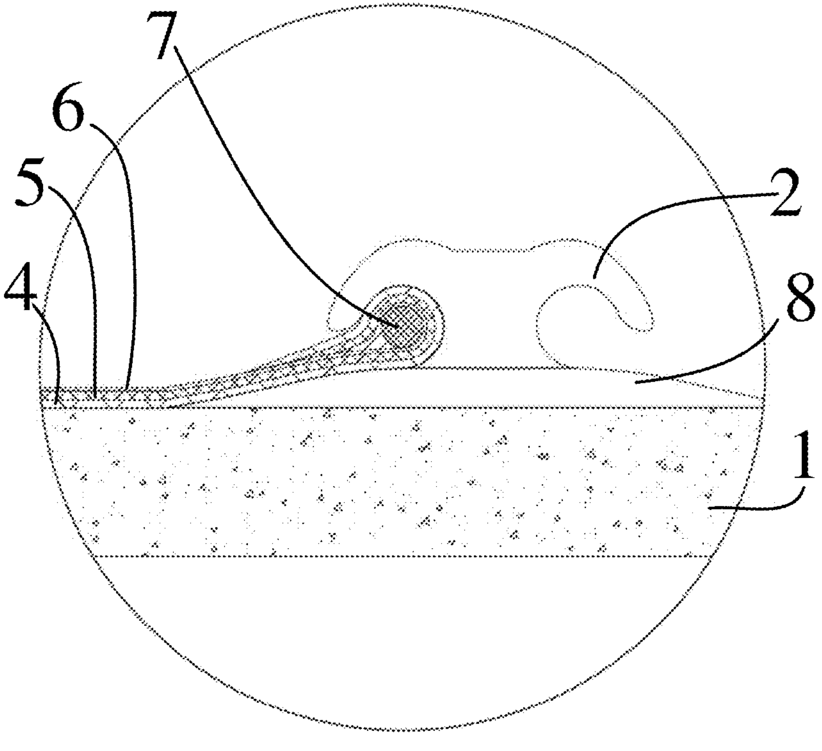
FIG. 34 is a schematic diagram of the partially enlarged structure of Part C in FIG. 33.
Figure 35:
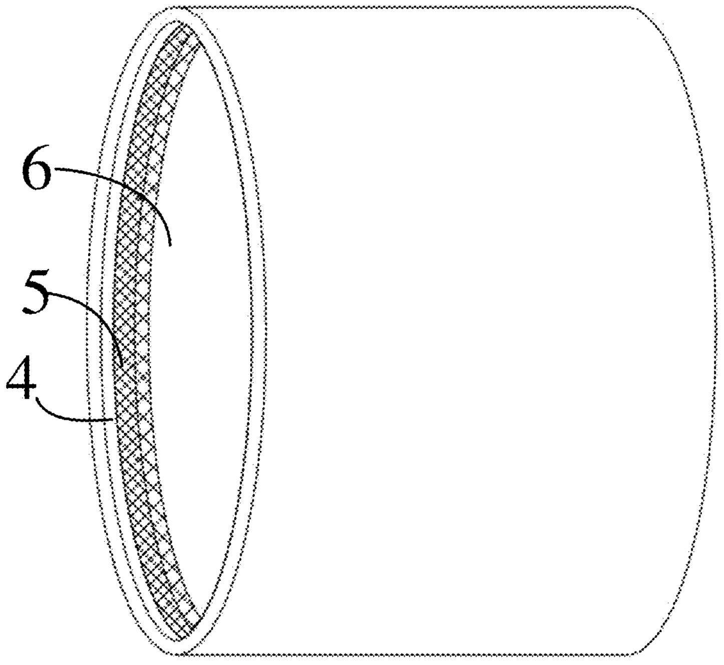
FIG. 35 is a three-dimensional structural schematic diagram of a typical direction of an underground rock gas storage cavern with a ring sealed inner lining provided in Example 2 of the present invention.
Figure 36:
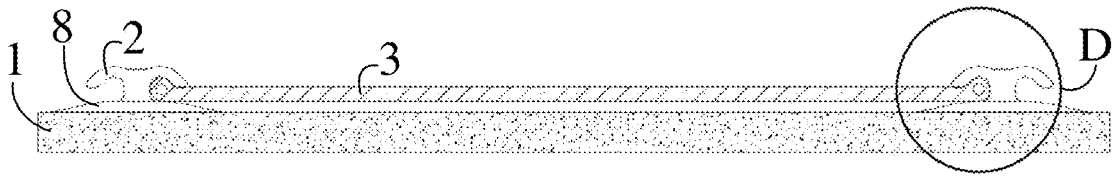
FIG. 36 is a schematic diagram of the cross-sectional structure of an underground rock gas storage cavern with an annular sealing lining provided in Example 2 of the present invention.
Figure 37:
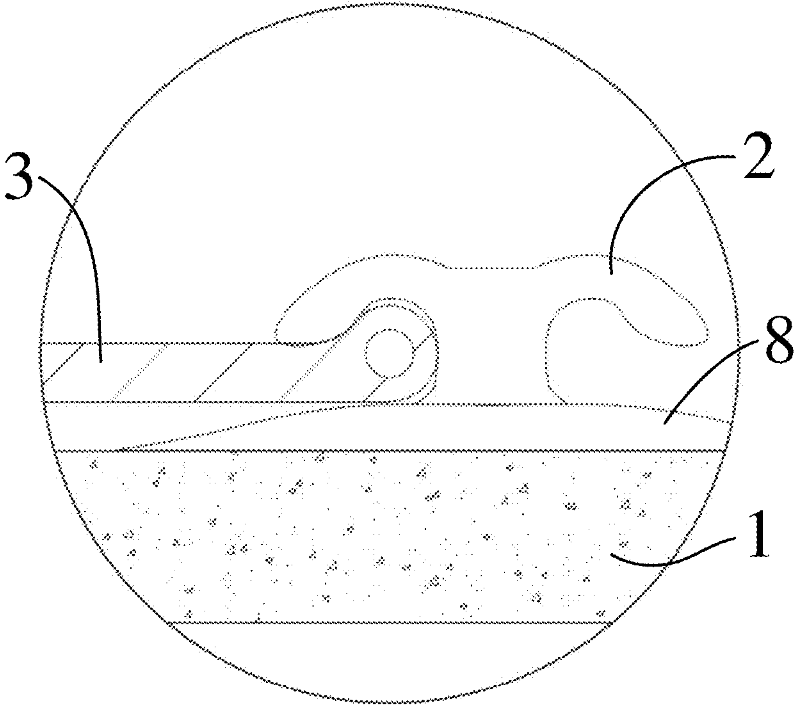
FIG. 37 is a schematic diagram of the partially enlarged structure of Part D in FIG. 36.
Figure 38:
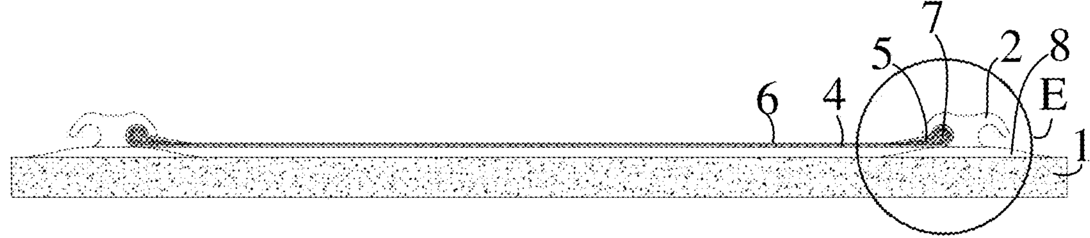
FIG. 38 is a detailed cross-sectional structure diagram of an underground rock gas storage cavern with a ring sealed inner lining provided in Example 2 of the present invention (where the curtain layer 5 is located at the umbrella shaped skeleton with a semi open capacity space clamp, and the airtight layer is in a relaxed state)
Figure 39:
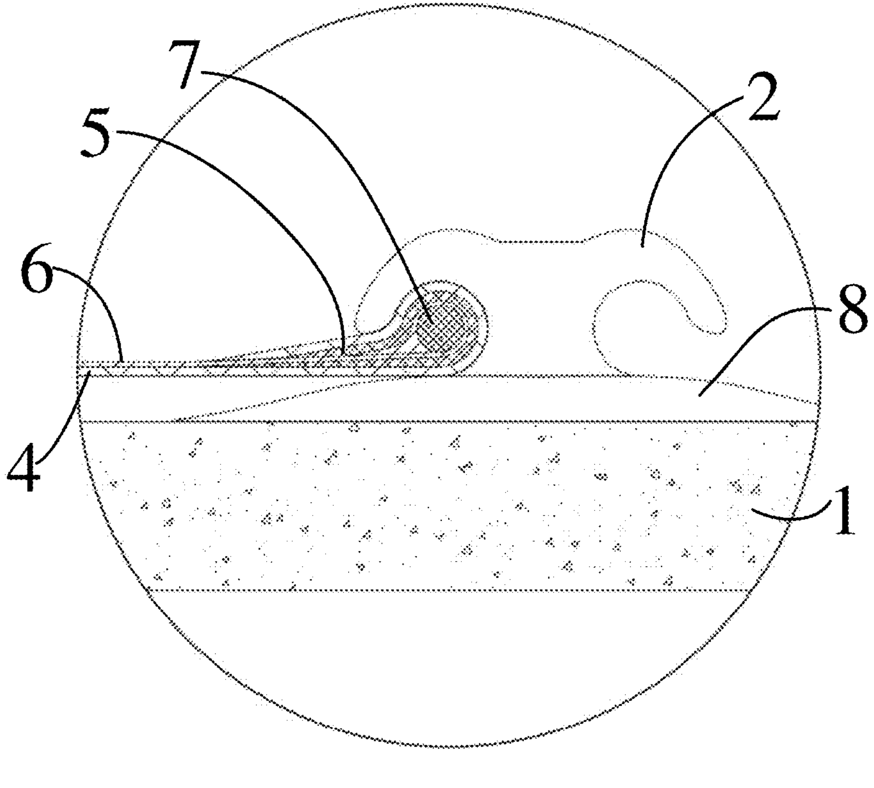
FIG. 39 is a schematic diagram of the partially enlarged structure of Part E in FIG. 11.
Figure 40:
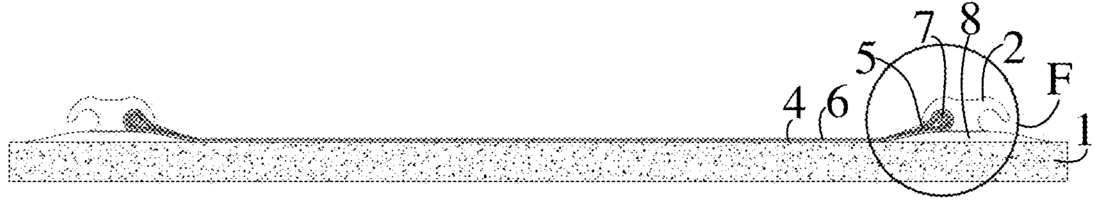
FIG. 40 is a detailed cross-sectional structure diagram of an underground rock gas storage cavern with a ring sealed inner lining provided in Example 2 of the present invention (wherein the curtain layer 5 is located at the umbrella shaped foot frame with a semi open capacity space clamp, and the airtight layer is in an inflated state)
Figure 41:
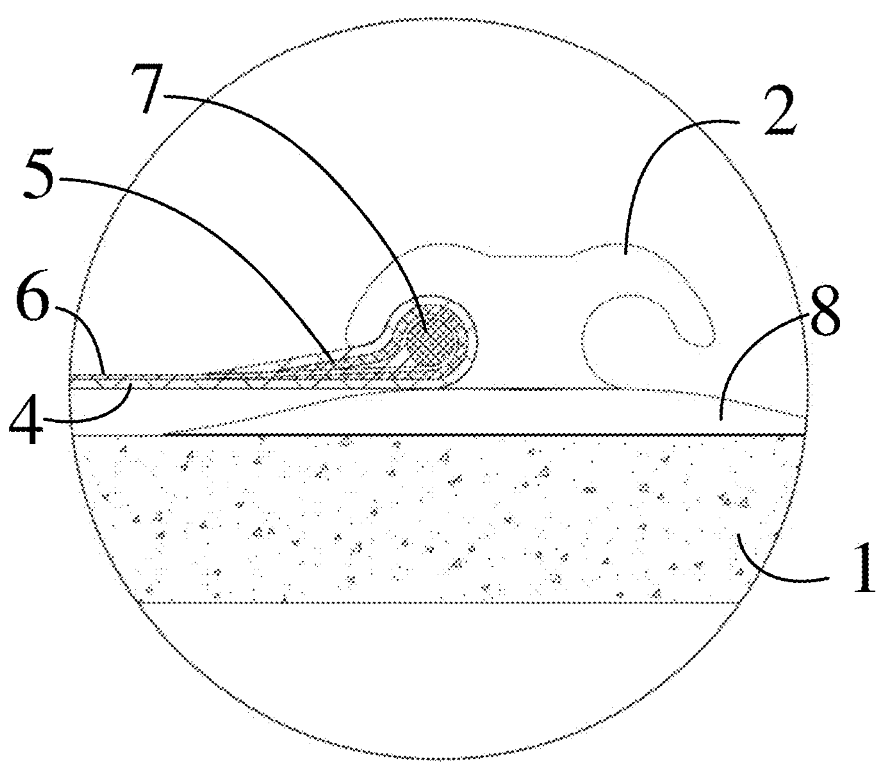
FIG. 41 is a schematic diagram of the partially enlarged structure of Part F in FIG. 40.
Figure 42:
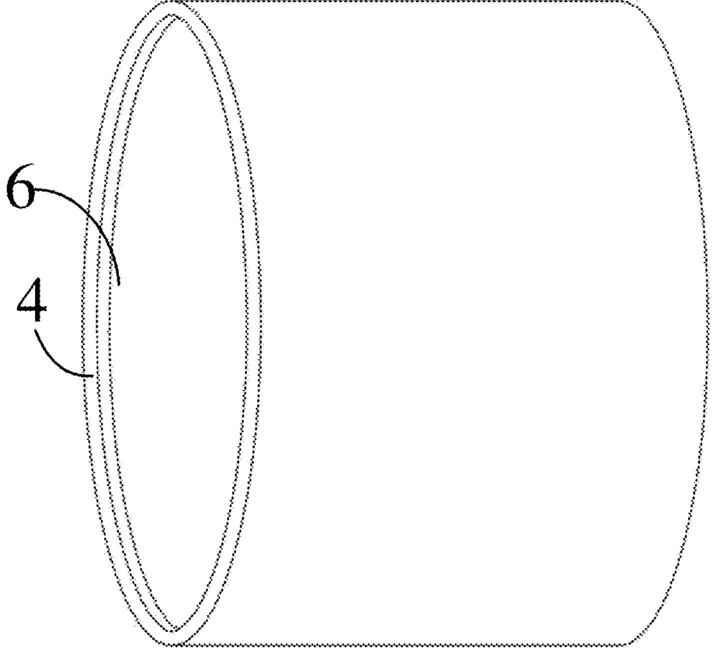
FIG. 42 is a three-dimensional structural schematic diagram of a typical direction of an underground rock gas storage cavern with a ring sealed inner lining provided in Example 3 of the present invention.
Figure 43:
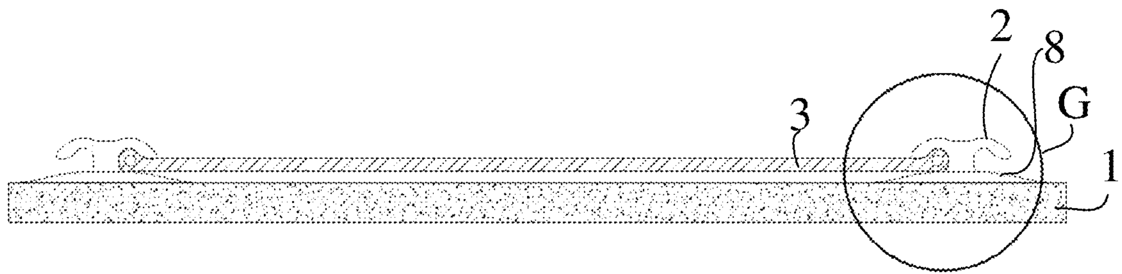
FIG. 43 is a schematic diagram of the cross-sectional structure of an underground rock gas storage cavern with an annular sealing lining provided in Example 3 of the present invention.
Figure 44:
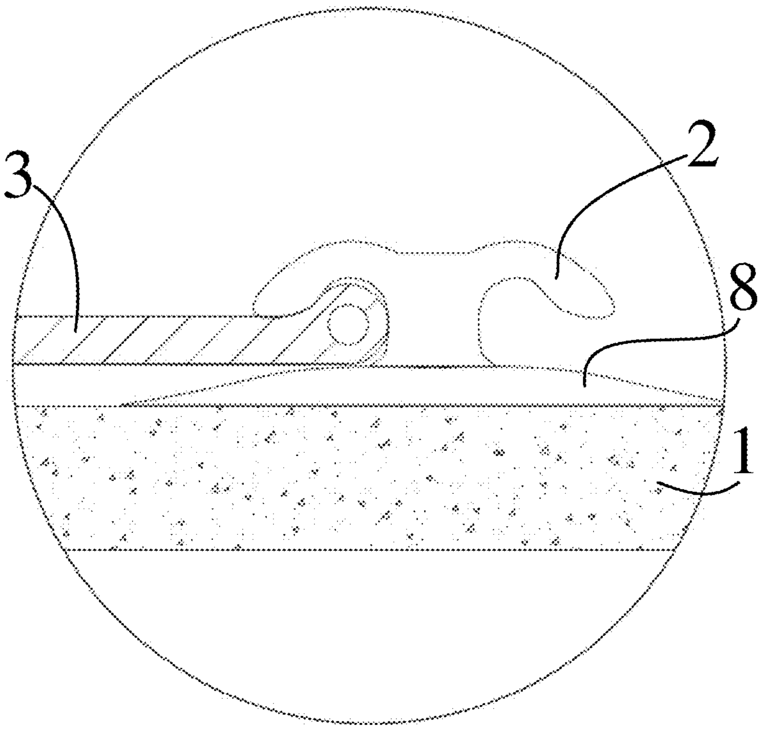
FIG. 44 is a schematic diagram of the partially enlarged structure of Part G in FIG. 43.
Figure 45:
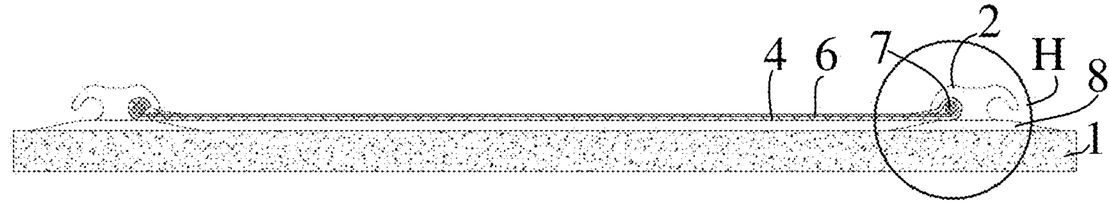
FIG. 45 is a detailed cross-sectional structure diagram of an underground rock gas storage cavern with a ring sealed inner lining provided in Example 3 of the present invention (where there is no curtain layer and the airtight layer is in a relaxed state)
Figure 46:
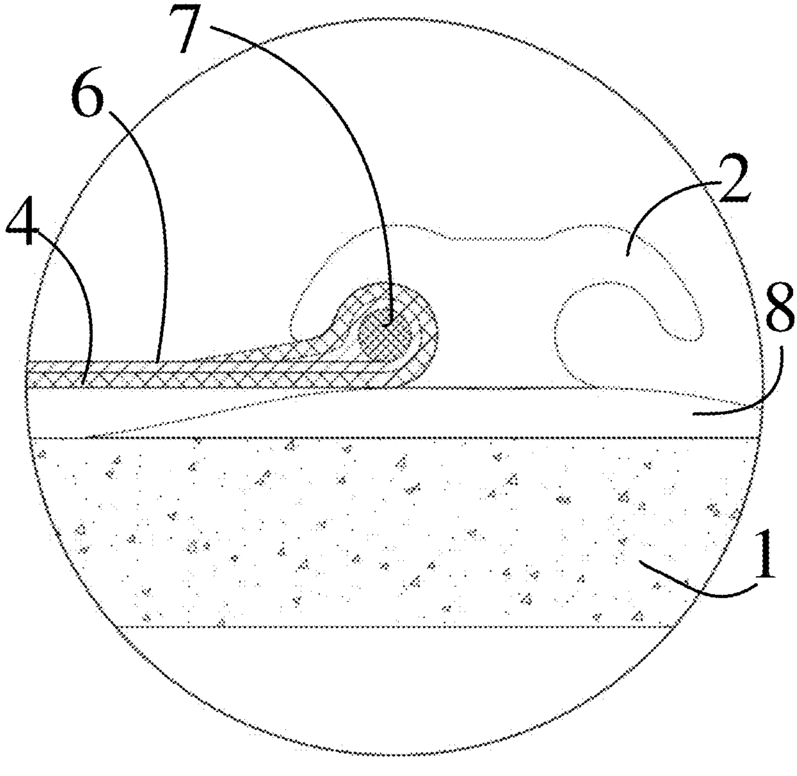
FIG. 46 is a schematic diagram of the partially enlarged structure of Part H in FIG. 45.
Figure 47:
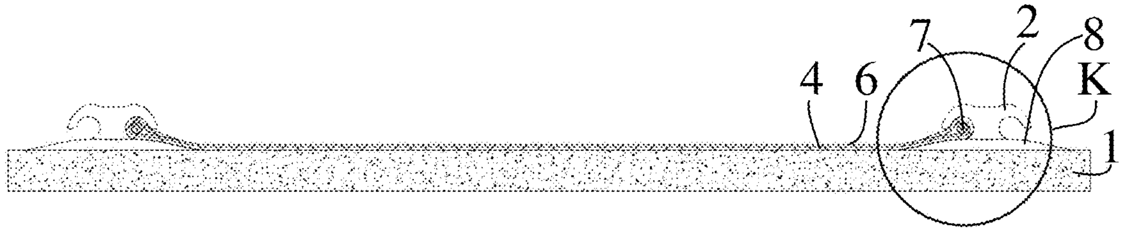
FIG. 47 is a detailed cross-sectional structure diagram of an underground rock gas storage cavern with a ring sealed inner lining provided in Example 3 of the present invention (where there is no curtain layer and the airtight layer is in an inflated state)
Figure 48:
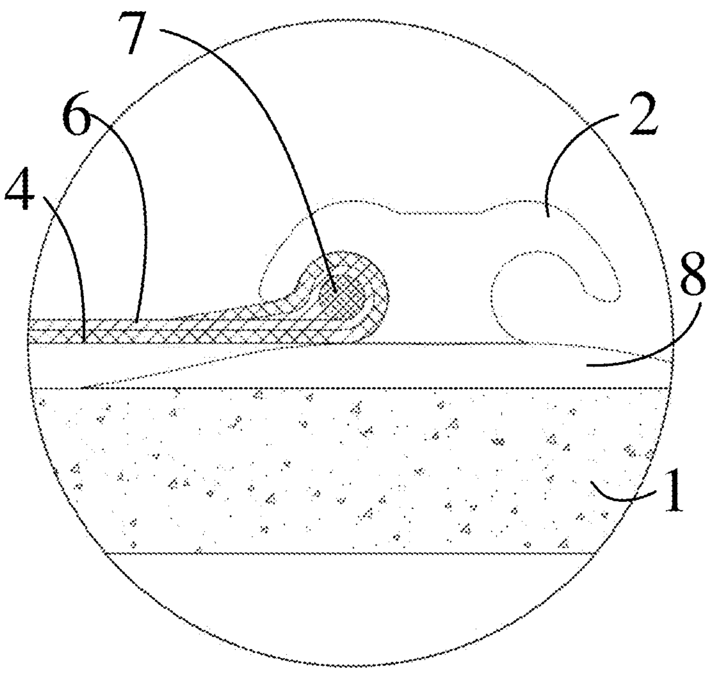
FIG. 48 is a schematic diagram of the partially enlarged structure of part K in FIG. 47.
Figure 49:
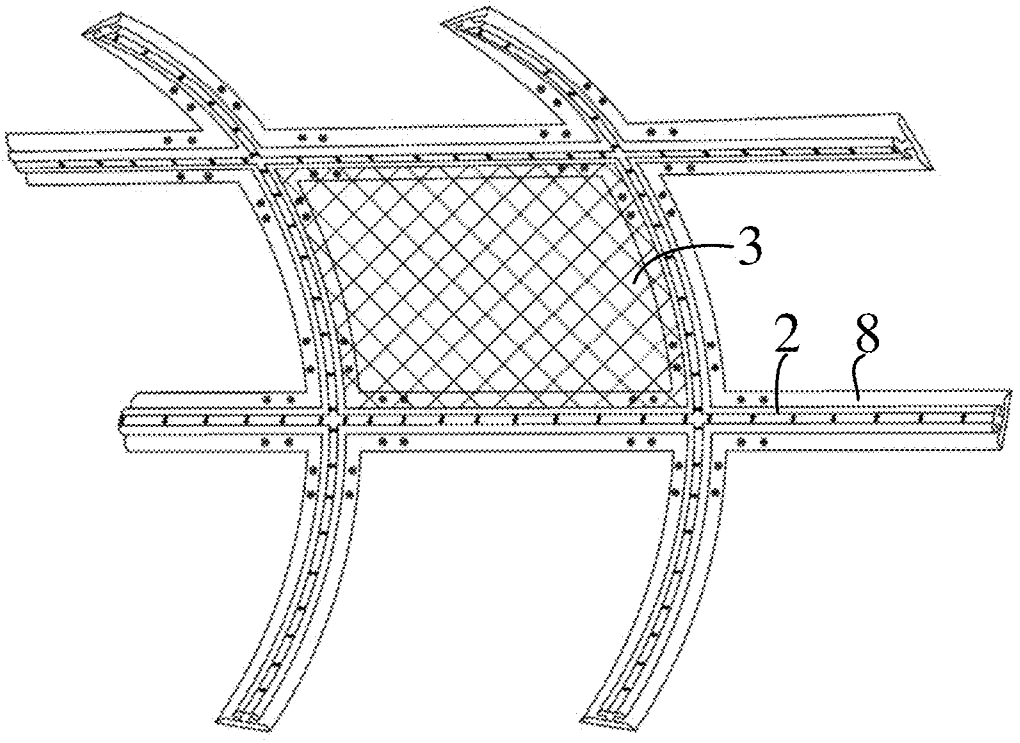
FIG. 49 is a schematic diagram of the coordination relationship between multiple foot rest bottom plate shaped fixed parts arranged in a crisscross manner and the sealing layer provided in the embodiment of this utility model.
Figure 50:
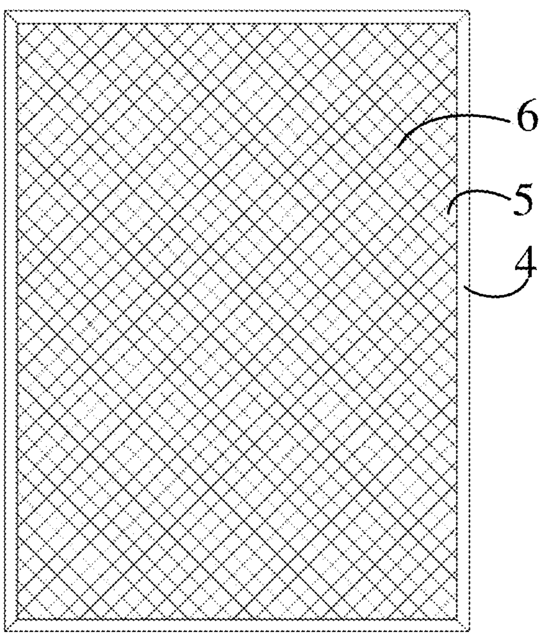
FIG. 50 is a three-dimensional structural schematic diagram of a typical direction of an underground rock gas storage cavern with a sheet-like sealing lining provided in Example 1 of the present invention.
Figure 51:
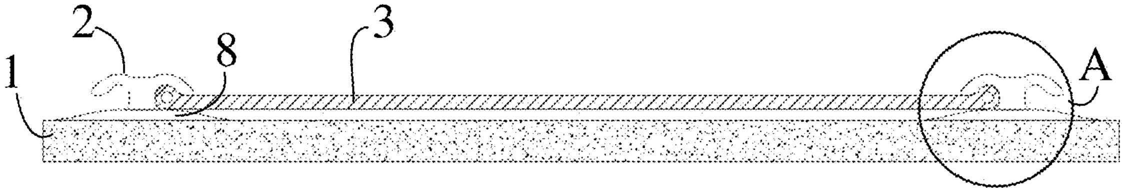
FIG. 51 is a schematic diagram of the cross-sectional structure of an underground rock gas storage cavern with a sheet-like sealing lining provided in Example 1 of the present invention.
Figure 52:
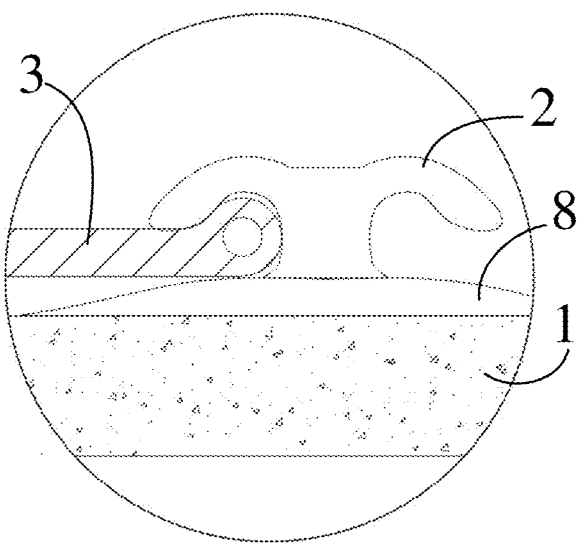
FIG. 52 is a schematic diagram of the partially enlarged structure of Part A in FIG. 51.
Figure 53:
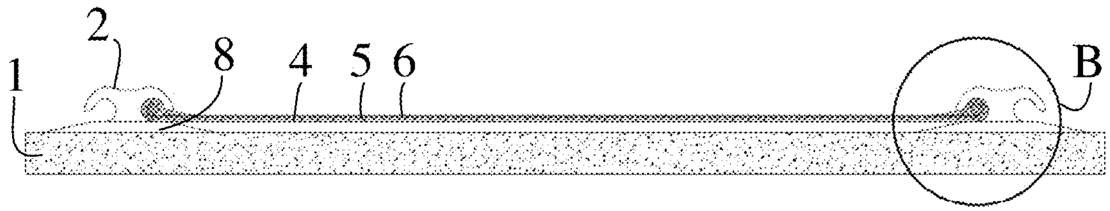
FIG. 53 is a detailed cross-sectional structure diagram of an underground rock gas storage chamber with a sheet-like sealing lining provided in Example 1 of the present invention (where the curtain layer 5 is distributed throughout the entire airtight layer, and the airtight layer is in a relaxed state)
Figure 54:
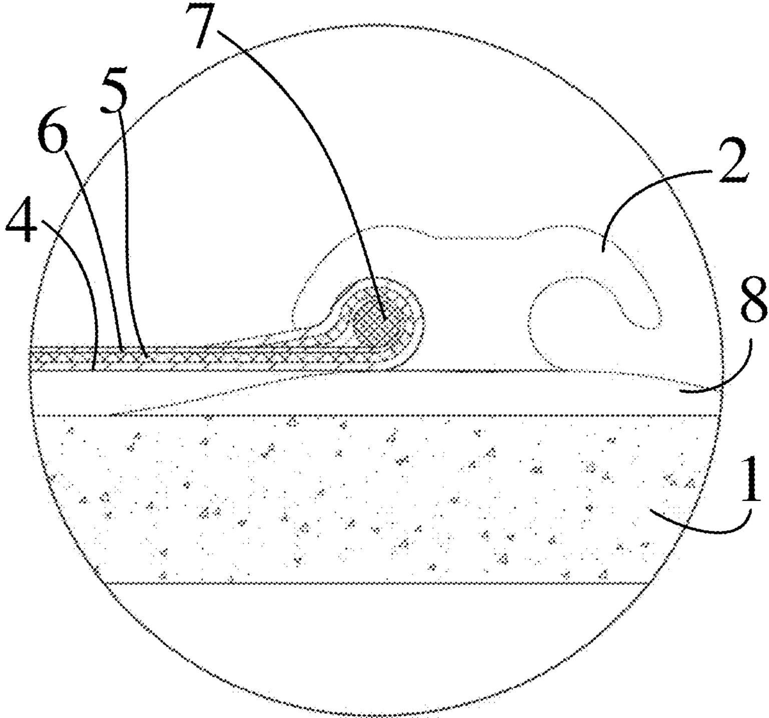
FIG. 54 is a schematic diagram of the partially enlarged structure of Part B in FIG. 53.
Figure 55:
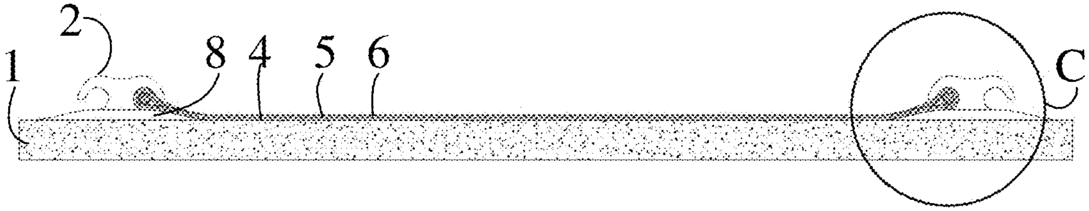
FIG. 55 is a detailed cross-sectional structure diagram of an underground rock gas storage chamber with a sheet-like sealing lining provided in Example 1 of the present invention (where the curtain layer 5 is distributed throughout the entire airtight layer, and the airtight layer is in an inflated state)
Figure 56:
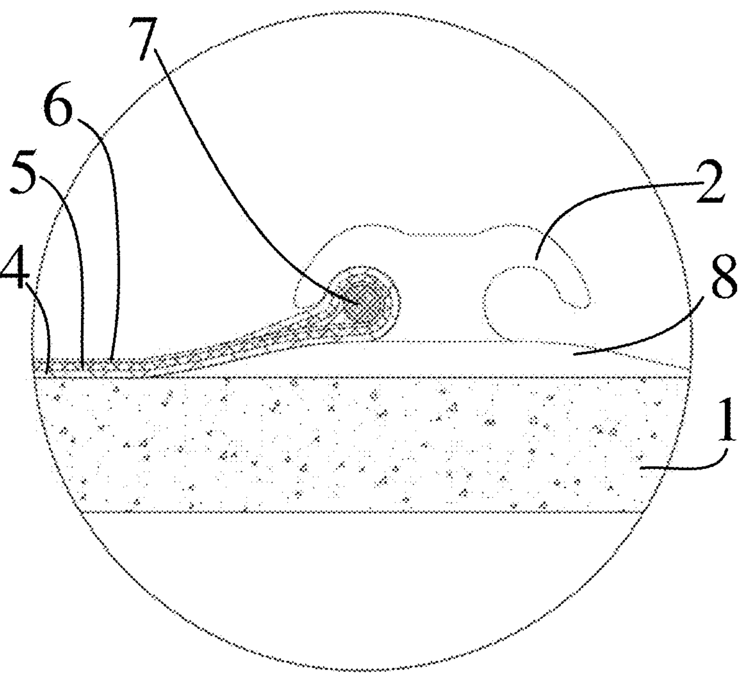
FIG. 56 is a schematic diagram of the partially enlarged structure of Part C in FIG. 55.
Figure 57:
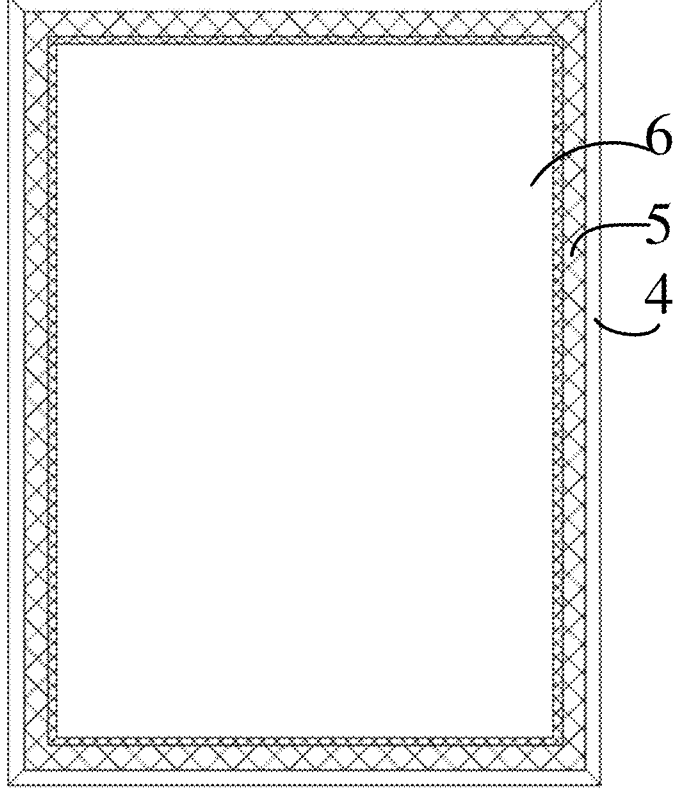
FIG. 57 is a three-dimensional structural schematic diagram of a typical direction of an underground rock gas storage cavern with a sheet-like sealing lining provided in Example 2 of the present invention.
Figure 58:
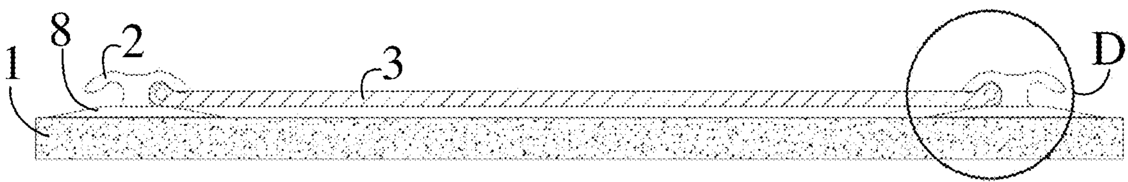
FIG. 58 is a schematic diagram of the cross-sectional structure of an underground rock gas storage cavern with a sheet-like sealing lining provided in Example 2 of the present invention.
Figure 59:
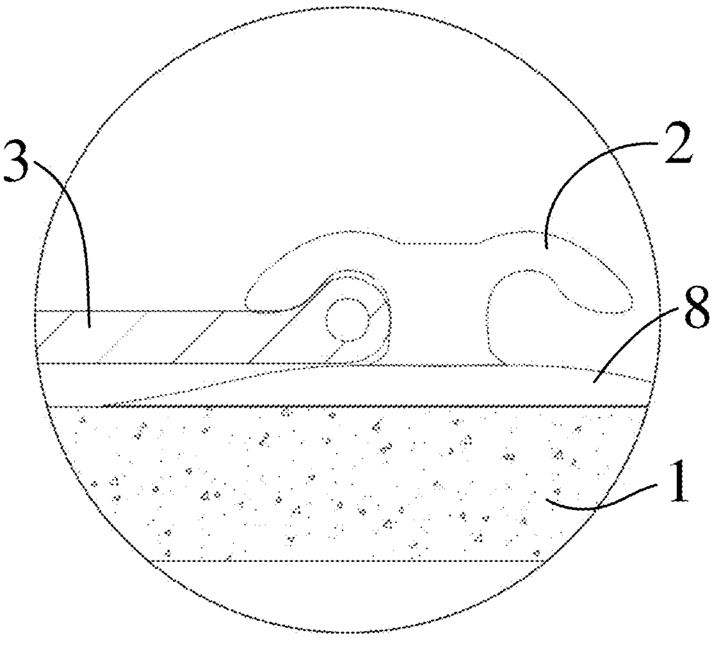
FIG. 59 is a schematic diagram of the partially enlarged structure of Part D in FIG. 58.
Figure 60:
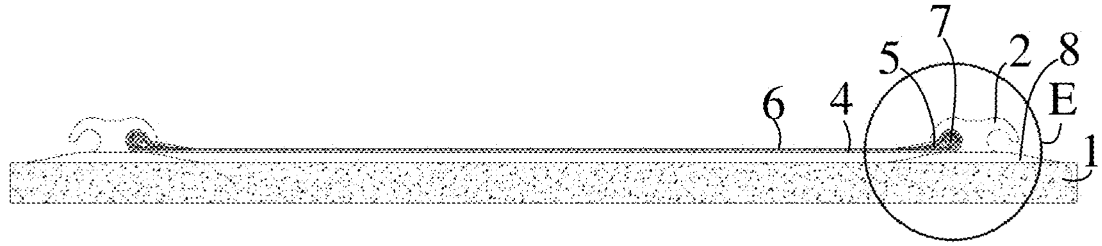
FIG. 60 is a detailed cross-sectional structure diagram of an underground rock gas storage chamber with a sheet-like sealing lining provided in Example 2 of the present invention (wherein the curtain layer 5 is located at the semi open capacity space clamp of the umbrella shaped skeleton, and the airtight layer is in a relaxed state)
Figure 61:
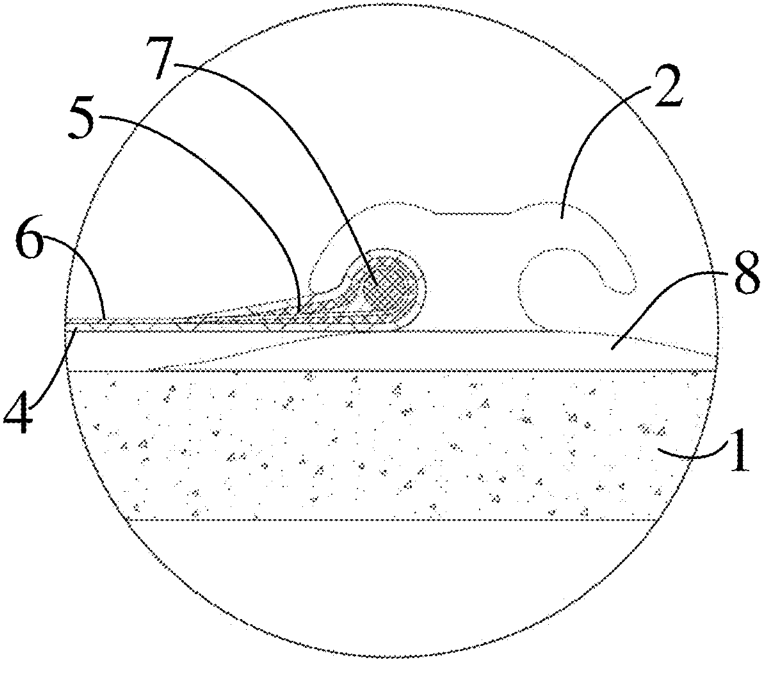
FIG. 61 is a schematic diagram of the partially enlarged structure of Part E in FIG. 60.
Figure 62:
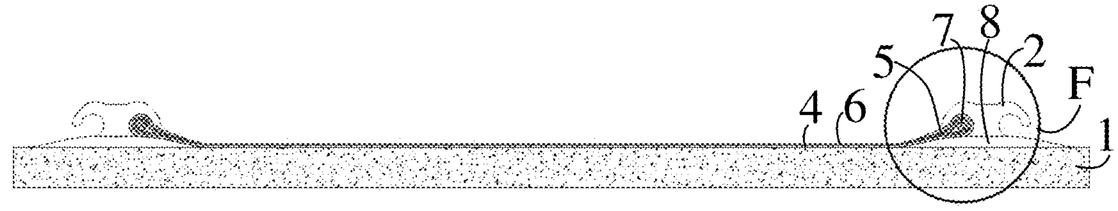
FIG. 62 is a detailed cross-sectional structure diagram of an underground rock gas storage cavern with a sheet-like sealing lining provided in Example 2 of the present invention (where the curtain layer 5 is located at the semi open capacity space clamp of the umbrella foot frame, and the airtight layer is in an inflated state)
Figures 63, 64:
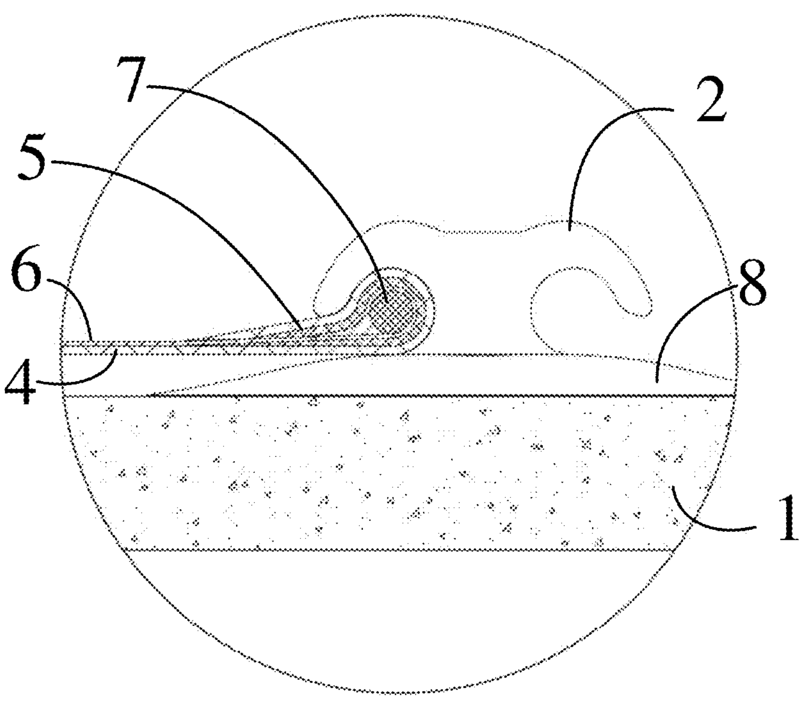
FIG. 63 is a schematic diagram of the partially enlarged structure of Part F in FIG. 62.
FIG. 64 is a three-dimensional structural schematic diagram of a typical direction of an underground rock gas storage cavern with a sheet-like sealing lining provided in Example 3 of the present invention.
Figure 65:
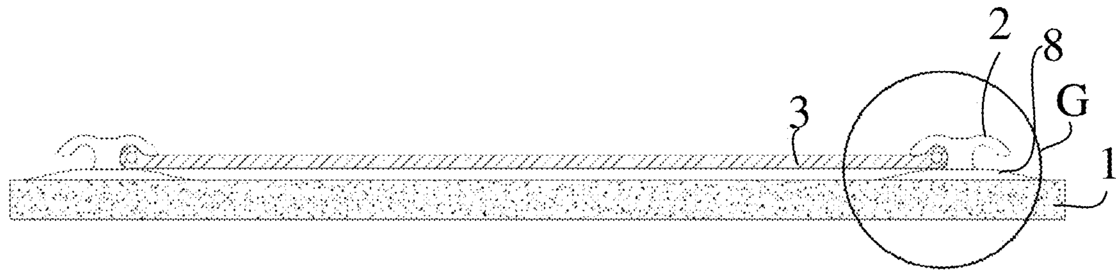
FIG. 65 is a schematic diagram of the cross-sectional structure of an underground rock gas storage cavern with a sheet-like sealing lining provided in Example 3 of the present invention.
Figure 66:
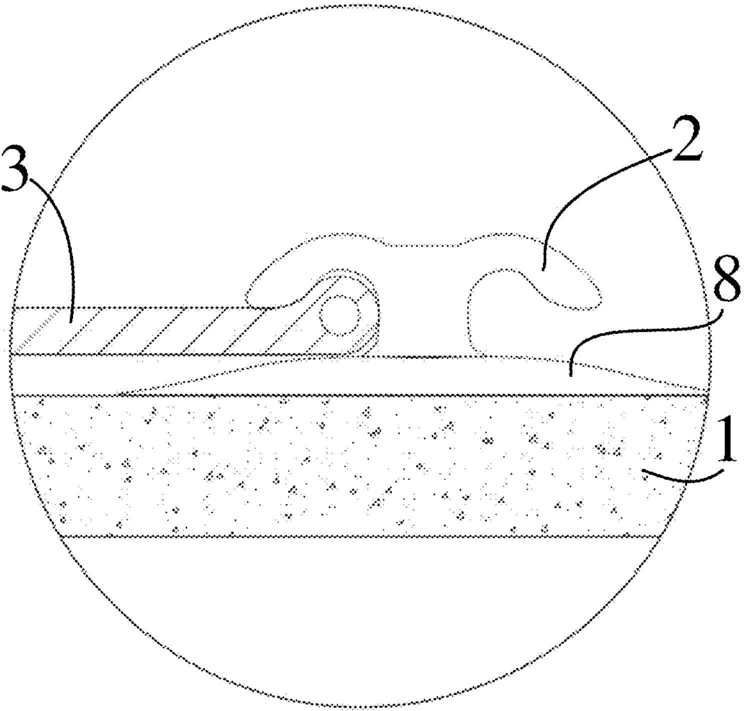
FIG. 66 is a schematic diagram of the partially enlarged structure of Part G in FIG. 65.
Figure 67:
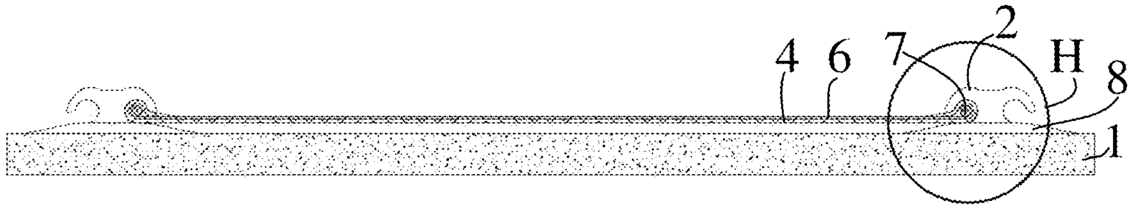
FIG. 67 is a detailed cross-sectional structure diagram of an underground rock gas storage chamber with a sheet-like sealing lining provided in Example 3 of the present invention (where there is no curtain layer and the airtight layer is in a relaxed state)
Figure 68:
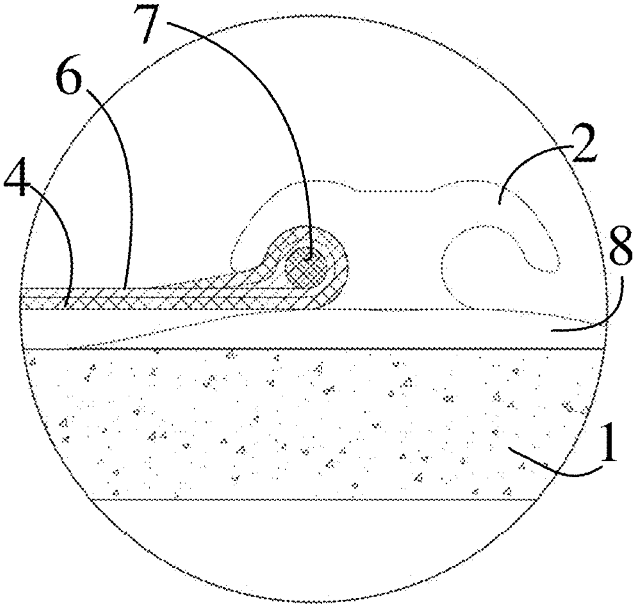
FIG. 68 is a schematic diagram of the partially enlarged structure of Part H in FIG. 67.
Figure 69:
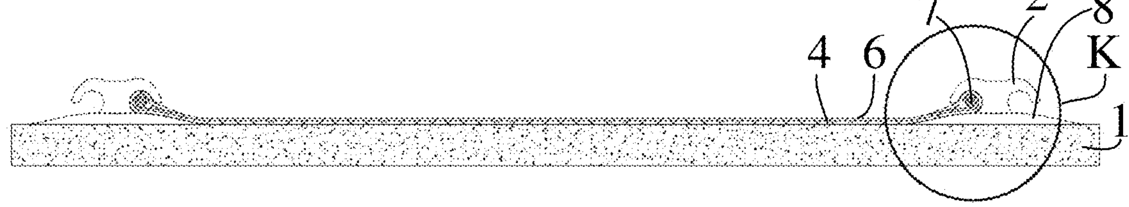
FIG. 69 is a detailed cross-sectional structure diagram of an underground rock gas storage chamber with a sheet-like sealing lining provided in Example 3 of the present invention (where there is no curtain layer and the airtight layer is in an inflated state)
Figure 70:
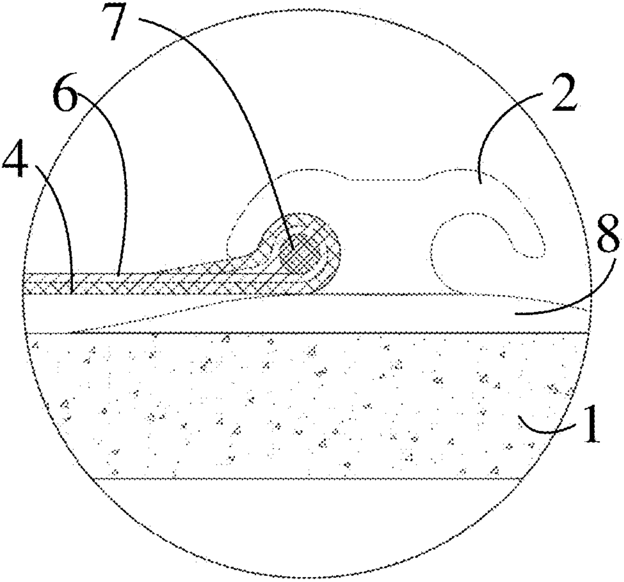
FIG. 70 is a schematic diagram of the partially enlarged structure of part K in FIG. 69.

Dome Sealing Lining Structure and Construction Method of Tripod Type Underground Rock Lined Cavern Referring to FIG. 27, the construction method of the dome sealing inner lining structure of the footrest type underground rock lining chamber provided by the present invention includes the following steps:

Step S1: Drill connection holes on concrete lining layer 1,

Step S2: Place the dome skeleton 3 and the columnar skeleton 26 inside the concrete lining layer 1, and apply connecting bolts and the fixed bottom plate of the foot frame bottom plate connectors provided by the dome skeleton 3 and the columnar skeleton 26 to connect and fix the dome skeleton 3 and the columnar skeleton 26 to the concrete lining layer 1;

Step S3: Connect the fan ring airtight layer 4 and the pillar ring airtight layer 27 to the dome skeleton 3 and the pillar skeleton 26, to obtain the dome sealing inner lining structure of the footrest underground rock lined cavern.

The construction process of the dome sealed inner lining structure of the foot frame type underground rock lined cavern provided by the embodiment of the present invention does not require the provision of an overall sealed inner lining structure in the concrete lining layer 1. Instead, a skeleton is first laid out in the concrete lining layer 1, and the airtight layer is connected between the skeletons, ultimately forming the dome sealed inner lining structure of the underground rock lined cavern. Compared to the overall sealing layer, the installation is more convenient, the work efficiency is higher, and the cost is lower.

Among them, the construction method of the dome sealing inner lining structure of the tripod type underground rock lining cavern also includes the following steps:

Step S4: Conduct experimental gas storage inside the dome sealing lining structure of a tripod type underground rock lined cavern, determine sealing performance, and monitor possible leak points.

In this case, once the dome sealing lining structure of the tripod type underground rock lined cavern experiences air leakage, timely measures can be taken to repair it.

Ring Sealing Liner

Referring to FIGS. 28 to 48, the annular sealing lining provided in the embodiments of the present invention includes a foot rest bottom plate shaped fixed part and a sealing layer 3. The tripod base plate shaped fixed part is in a circular shape, and the tripod base plate shaped fixed part includes a fixed base plate 8 and an umbrella shaped base plate 2. After cutting and unfolding the tripod base plate shaped fixed part along the axis direction, the fixed base plate 8 has a length direction and a width direction, the umbrella shaped base plate 2 has a length direction and a width direction, and the umbrella shaped base plate 2 has a connecting part and an umbrella shaped part. The umbrella shaped part is set at the top of the connecting part, so that the umbrella shaped part faces towards the connecting part and has protrusions on both sides of the length direction of the umbrella shaped base plate 2. The umbrella shaped base plate 2 uses its connecting part to fix the fixed base plate 8 along the length direction of the fixed base plate 8, forming a connection between the umbrella shaped part of the umbrella shaped base plate 2 and the fixed base plate 8. Equipped with a semi open storage space clamp, the height of the semi open storage space near the connection part of the umbrella shaped tripod 2 is h1. The height of the open side of the semi open storage space near the umbrella shaped tripod 2 is h2, with h1>h2. The first end of the sealing layer 3 is embedded in the semi open capacity space clamp formed by the first leg bottom plate shaped fixed part, and the second end of the sealing layer 3 is embedded in the semi open capacity space clamp formed by the second leg bottom plate shaped fixed part. Among them, the center of the first leg bottom plate shaped fixed part and the second leg bottom plate shaped fixed part is aligned, and the sealing layer 3 is a multi-layer structure.

The annular sealing inner lining provided in the embodiment of the present invention can be embedded with a sealing layer 3 at the clamping mouth of a semi open containment space formed by a foot frame bottom plate shaped fixed part. Since the height of the semi open containment space near the connection part of the umbrella shaped foot frame is greater than the height of the semi open containment space near the open side position of the umbrella shaped foot frame, it is possible to use the outer edge of the umbrella shaped foot frame 2 to form an embedding with the sealing layer 3, thereby avoiding the displacement or detachment of the sealing layer 3 and ensuring airtightness. Therefore, it is formed inside the concrete lining layer 1 of the underground chamber. Its construction period is shorter than that of welded steel plates, the cost is lower, it has good sealing performance, and the replacement of components is convenient and easier to maintain. On the premise of ensuring tightness, the airtightness can meet the usage requirements. Due to the circular shape of the bottom plate shaped fixed part of the tripod, it can ensure that the indoor lining of the underground tunnel is always circular and isotropic. In addition, the sealing layer 3 has a short construction period, and the components can be prefabricated. Compared to the traditional steel plate lining that requires on-site welding, it can save a lot of construction time, and the cost will also be lower. During maintenance, the damaged parts can be directly replaced. Among them, the sealing layer 3 of the annular sealing lining provided by the present invention is made of a multi-layer structure, and each layer has a corresponding function, which can improve the airtightness and practicality of the sealing layer 3.

Among them, refer to FIGS. 28 to 48, and the inner lining of the ring seal also includes steel wire 7. After the first end of the sealing layer 3 is wrapped with steel wire 7, it is embedded in a semi open capacity space clamp formed by the first foot frame bottom plate shaped fixed part. Among them, the shape of the first end of the sealing layer 3 after wrapping steel wire 7 is adapted to the shape of the semi open capacity space clamp formed by the first foot frame bottom plate shaped fixed part. After the second end of the sealing layer 3 is wrapped with steel wire 7, it is embedded in a semi open capacity space clamp formed by the second foot frame bottom plate shaped fixed part. Among them, the shape of the second end of the sealing layer 3 wrapped with steel wire 7 is adapted to the shape of the semi open capacity space clamp formed by the second foot frame bottom plate shaped fixed part. In this case, it is possible to ensure that the annular sealing liner is perfectly matched with the shape of the clamp formed by the foot frame bottom plate fixed part with a semi open storage space when embedded, thereby ensuring the airtightness between the annular sealing liner and the embedded part of the clamp formed by the foot frame bottom plate fixed part with a semi open storage space.

Among them, refer to FIGS. 42 to 48, and the sealing layer 3 includes a rubber layer 4 and an airtight layer 6. The rubber layer 4 is located on the inner side of the airtight layer 6, wrapped with steel wire 7. The remaining part of the airtight layer 6 is joined to the main body of the airtight layer 6, and the remaining part of the rubber layer 4 is joined to the main body of the airtight layer 6. In this case, the rubber layer (4) has a high friction force and the property of being deformable under compression. When it is embedded with the clamp formed by the foot frame bottom plate shaped part with a semi open storage space, it can prevent the sealing layer 3 from falling off from the clamp with a semi open storage space, and further ensure the airtightness of the annular sealing lining between the embedded part of the clamp formed by the foot frame bottom plate shaped part with a semi open storage space.

Among them, refer to FIGS. 35 to 41, and the annular sealing lining also includes a curtain layer 5. Cord layer 5 is set between rubber layer 4 and airtight layer 6, and it is only located in the local area where the sealing layer 3 is wrapped with steel wire 7. The curtain layer 5 has tensile performance, and in this case, it can avoid the possibility of the ring sealing lining provided by the present invention breaking due to the increase in internal pressure in the chamber during the operation of the compressed air energy storage power station. The embedded part of the ring sealing lining in the clamp with a semi open capacity space formed by the foot frame bottom plate shaped component can be avoided.

Among them, refer to FIGS. 28-34, and the annular sealing lining also includes a curtain layer 5. The main body and wrapping part of rubber layer 4 form the first layer, the main body and wrapping part of airtight layer 6 form the third layer, and the curtain layer 5 is set between the first and third layers to form an intermediate layer. The curtain layer 5 has tensile performance, and in this case, it can avoid the possibility of the ring sealing lining provided by the present invention breaking due to the increased pressure inside the chamber during the operation of the compressed air energy storage power station.

Among them, the clamp opening of the umbrella shaped tripod 2 has a rounded transition. In this case, the fracture caused by stress concentration can occur between the embedded part of the clamp with a semi open storage space formed by the ring sealing liner and the foot frame bottom plate shaped part, thereby extending the service life of the ring sealing liner provided in the embodiments of the present invention.

Among them, the fixed bottom plate 8 gradually increases in height in a streamlined manner from the outer edge of the fixed bottom plate 8 to the bottom of the connecting part of the umbrella shaped tripod 2. In this case, when the annular sealing lining provided in the embodiment of the present invention is installed on the concrete lining layer 1 to form an underground rock gas storage chamber, even if the underground rock gas storage chamber is in an inflated state, it can avoid stress concentration caused by fracture between the annular sealing lining provided in the embodiment of the present invention and the fixed bottom plate 8, thereby extending the service life of the annular sealing lining provided in the embodiment of the present invention.

The underground rock gas storage chamber provided by the embodiments of the present invention includes a concrete lining layer 1 and a ring sealing lining provided by the present invention. The first tripod base plate shaped fixing member is fixedly connected to one edge of the axial direction of the ring sealing liner, and the second tripod base plate shaped fixing member is fixedly connected to the other edge of the axial direction of the ring sealing liner, so that the sealing layer 3 is attached to the inner wall of the concrete lining layer 1.

Underground Rock Gas Storage Cavern

The underground rock gas storage cavern provided in the embodiments of the present invention can utilize a semi open containment space clamp formed by a foot frame bottom plate shaped fixed part to embed a sealing layer 3 in the annular sealing lining. Among them, since the height of the semi open containment space near the connection part of the umbrella shaped foot frame is greater than the height of the semi open containment space near the open side position of the umbrella shaped foot frame, it is possible to use the outer edge of the umbrella shaped foot frame 2 to form an embedding with the sealing layer 3, thereby avoiding the displacement or detachment of the sealing layer 3 and ensuring air tightness. Therefore, it is formed inside the concrete lining layer 1 of the underground chamber. Its construction period is shorter than that of welded steel plates, the cost is lower, it has good sealing performance, and the replacement of components is convenient and easier to maintain. On the premise of ensuring tightness, the airtightness can meet the usage requirements. Due to the circular shape of the bottom plate shaped fixed part of the tripod, it can ensure that the indoor lining of the underground tunnel is always circular and isotropic. In addition, the sealing layer 3 has a short construction period, and the components can be prefabricated. Compared to the traditional steel plate lining that requires on-site welding, it can save a lot of construction time, and the cost will also be lower. During maintenance, the damaged parts can be directly replaced. Among them, the sealing layer 3 of the annular sealing lining provided by the present invention is made of a multi-layer structure, and each layer has a corresponding function, which can improve the airtightness and practicality of the sealing layer 3.

Among them, the concrete lining layer 1 is connected in series in multiple sections, and the ring sealing lining is connected in series through the foot frame bottom plate shaped fixing piece in multiple sections. In this case, due to the clamp openings with semi open storage space formed on both sides of the tripod base plate shaped fixed part, the annular sealing lining after series connection can still ensure airtightness. Moreover, with the help of the tripod base plate shaped fixed part, the construction cost of series connection is low and installation is convenient.

Construction Methods for Underground Rock Gas Storage Caverns

The construction method of the underground rock gas storage cavern provided in the embodiments of the present invention includes the following steps:

According to the inner diameter of the underground chamber, a circular foot frame bottom plate shaped fixed component is installed on the inner wall of the concrete lining layer 1 of the underground chamber, so that the outer diameter of the circular foot frame bottom plate shaped fixed component matches the inner diameter of the underground chamber;

The sealing layer 3 is embedded in a circular footrest bottom plate shaped fixed part through a semi open capacity space clamp, so that the inner wall of the underground chamber forms the sealing inner lining structure provided in the embodiment of the present invention.

During the construction process of the underground rock gas storage cavern provided by the embodiments of the present invention, a semi open containment space clamp formed by a foot frame bottom plate shaped fixed part can be used to embed a sealing layer 3 in the ring type sealing lining. Among them, since the height of the semi open containment space near the connection part of the umbrella shaped foot frame is greater than the height of the semi open containment space near the open side position of the umbrella shaped foot frame, it is possible to use the outer edge of the umbrella shaped foot frame 2 to form a joint with the sealing layer 3, thereby avoiding the displacement or detachment of the sealing layer 3 and ensuring air tightness. Therefore, it is formed inside the concrete lining layer 1 of the underground chamber. Its construction period is shorter than that of welded steel plates, the cost is lower, it has good sealing performance, and the replacement of components is convenient and easier to maintain. On the premise of ensuring tightness, the airtightness can meet the usage requirements. Due to the circular shape of the bottom plate shaped fixed part of the tripod, it can ensure that the indoor lining of the underground tunnel is always circular and isotropic. In addition, the sealing layer 3 has a short construction period, and the components can be prefabricated. Compared to the traditional steel plate lining that requires on-site welding, it can save a lot of construction time, and the cost will also be lower. During maintenance, the damaged parts can be directly replaced. Among them, the sealing layer 3 of the annular sealing lining provided by the present invention is made of a multi-layer structure, and each layer has a corresponding function, which can improve the airtightness and practicality of the sealing layer 3.

Among them, according to the inner diameter of the underground chamber, circular foot frame bottom plate shaped fixed parts are fixedly arranged on the inner wall of the underground chamber, so that the outer diameter of the circular foot frame bottom plate shaped fixed parts matches the inner diameter of the underground chamber, including the following steps:

Drill the first type of connecting hole on the inner wall of the underground chamber;

Adjust the position of the foot frame bottom plate fixed part so that the second connection hole of the foot frame bottom plate fixed part corresponds to the position of the first connection hole on the inner wall of the underground chamber;

Screw the fastening bolts into the first and second connecting holes simultaneously, so that the foot frame bottom plate shaped fixed part is fixed to the inner wall of the underground chamber.

In this case, the sealing inner lining structure can be stably fixed on the inner wall of the concrete lining layer 1 of the underground chamber through the first and second connection holes, as well as tightening bolts, and the cost is low.

Among them, the sealing layer 3 is embedded in a circular footrest bottom plate shaped fixed part through a semi open capacity space clamp, so that the inner wall of the underground chamber forms the sealing lining structure provided by the present invention, and further comprises the following steps:

Conduct gas storage tests on underground chambers to determine their sealing performance;

Real time monitoring of possible air leakage points in underground tunnels.

In this case, real-time monitoring of possible leakage points in the underground chamber can be carried out, and once a leakage occurs, it can be promptly known and remedied.

During the process of real-time monitoring of possible air leakage points in underground tunnels, the possible air leakage points include: the connection between sealing layer 3 and the foot frame bottom plate fixed part, the connection between the foot frame bottom plate fixed part and the umbrella shaped part, the connection between the fixed bottom plate 8 of the foot frame bottom plate fixed part and the inner wall of the underground tunnel, and one or more parts of the sealing layer 3 itself. In this case, real-time monitoring can be accurately carried out for possible air leakage points in underground tunnels.

Among them, real-time monitoring of possible air leakage points in underground tunnels includes the following steps:

Install gas flow monitoring instruments at potential leakage points in underground tunnels, and set location labels for each gas flow monitoring instrument;

Set an alarm threshold for the gas flow monitoring instrument based on its location;

When an abnormal gas flow alarm occurs, determine the location of the leakage point in the underground chamber based on the location label of the gas flow monitoring instrument that triggered the alarm.

In this case, once a possible leakage point in the underground chamber occurs, the leakage point in the underground chamber can be accurately determined based on the alarm information and the location label of the gas flow monitoring instrument, and emergency repair measures can be taken.

Slice Sealing Lining

Referring to FIGS. 49-70, the sheet-type sealing lining provided by the embodiment of the present invention includes a plurality of foot-type base plate shaped parts and a sealing layer 3. The plurality of foot-type base plate shaped parts are arranged in a crisscross pattern, forming a hollow between them. The foot-type base plate shaped parts include a fixed base plate 8 and an umbrella-shaped foot 2. After cutting and unfolding the foot-type base plate shaped parts along the axis direction, the fixed base plate 8 has a length direction and a width direction, and the umbrella-shaped foot 2 has a length direction and a width direction. The umbrella-shaped foot 2 is provided with a connecting part and an umbrella-shaped part, and the umbrella-shaped part is arranged on the top of the connecting part, so that the umbrella-shaped part has protrusions towards the connecting part on both sides of the length direction of the umbrella-shaped foot 2. The umbrella-shaped foot 2 is fixedly connected to the fixed base plate 8 along the length direction of the fixed base plate 8 using its connecting part, so that a semi-open accommodation space is formed between the umbrella-shaped part of the umbrella-shaped foot 2 and the fixed base plate 8, with a height h1 near the connecting part of the umbrella-shaped foot 2 and a height h2 near the open side of the umbrella-shaped foot 2. h1>h2. The sealing layer 3 is arranged in a semi-open accommodation space through a nip, where the sealing layer 3 is a multi-layer structure.

The annular sealing lining provided by the embodiment of the present invention can utilize the semi-open accommodation space formed by the foot-stand base plate type molding piece to embed the sealing layer 3. Since the height of the semi-open accommodation space near the connection part of the umbrella-shaped foot-stand is greater than the height of the semi-open accommodation space near the open side of the umbrella-shaped foot-stand, it can be used to form a fit between the outer edge of the umbrella-shaped foot-stand 2 and the sealing layer 3, thereby avoiding displacement or detachment of the sealing layer 3 and ensuring airtightness. Therefore, it is formed on the inner side of the concrete lining layer 1 of the underground chamber. Its construction period is shorter than that of welding steel plates, its cost is lower, it has good sealing performance, and its parts are easy to replace and maintain. On the premise of ensuring fastening, its airtightness can meet the use requirements. Since the foot-stand base plate type molding piece is annular, it can ensure that the underground chamber lining always remains annular and isotropic. In addition, the sealing layer 3 has a short construction period and can be prefabricated. Compared with the traditional steel plate lining that requires on-site welding, it can save a lot of construction time and cost, and it can be directly replaced when damaged during maintenance. The sealing layer 3 of the sheet-type sealing lining provided by the present invention is made of multiple layers, each layer having a corresponding function, which can make the sealing layer 3 better in terms of airtightness and practicality.

Referring to FIGS. 49-70, the sheet-type sealing liner also includes a steel wire 7. After the first end of the sealing layer 3 wraps around the steel wire 7, it is embedded in the semi-open receiving space clamp formed by the first foot rest base plate shaped part. The shape of the first end of the sealing layer 3 after wrapping around the steel wire 7 is adapted to the shape of the semi-open receiving space clamp formed by the first foot rest base plate shaped part. After the second end of the sealing layer 3 wraps around the steel wire 7, it is embedded in the semi-open receiving space clamp formed by the second foot rest base plate shaped part. The shape of the second end of the sealing layer 3 after wrapping around the steel wire 7 is adapted to the shape of the semi-open receiving space clamp formed by the second foot rest base plate shaped part. In this case, when the sheet-type sealing liner is embedded in the semi-open receiving space clamp formed by the foot rest base plate shaped part, it can fully match the shape of the clamp, thereby ensuring airtightness between the embedded part of the sheet-type sealing liner and the semi-open receiving space clamp formed by the foot rest base plate shaped part.

Among them, referring to FIG. 64-FIG. 70, the sealing layer 3 includes a rubber layer 4 and an airtight layer 6. The rubber layer 4 is disposed on the inner side of the airtight layer 6, and after wrapping around the steel wire 7, the remaining part of the airtight layer 6 is joined to the main body of the airtight layer 6, and the remaining part of the rubber layer 4 is joined to the main body of the airtight layer 6. In this case, the rubber layer 4 has a large friction force and a property of being deformable under pressure. When it is fitted with a semi-open receiving space formed by a footrest bottom plate type molding part, it can prevent the sealing layer 3 from falling off from the semi-open receiving space, and further ensure the airtightness between the sheet-type sealing liner and the embedded part of the semi-open receiving space formed by the footrest bottom plate type molding part.

Among them, referring to FIG. 57-FIG. 63, the sheet-type sealing liner also includes a cord layer 5. The cord layer 5 is disposed between the rubber layer 4 and the airtight layer 6, and is only located in the part where the sealing layer 3 is wrapped by the steel wire 7. The cord layer 5 has tensile properties, which can avoid the possibility of the sheet-type sealing liner provided by the present invention cracking during the operation of a compressed air energy storage power station due to an increase in internal pressure in the chamber, caused by the embedding part of the sheet-type sealing liner forming a semi-open receiving space with a clamping opening with a footrest bottom plate-type molding piece.

Referring to FIGS. 2 to 8, the sheet-type sealing liner further includes a ply layer 5. The main body and the surrounding part of the rubber layer 4 constitute the first layer, and the main body and the surrounding part of the airtight layer 6 constitute the third layer. The ply layer 5 is positioned between the first and third layers, forming an intermediate layer. The ply layer 5 has tensile properties, which can prevent the sheet-type sealing liner provided by the present invention from rupturing due to increased internal pressure in the cave during the operation of a compressed air energy storage power station.

The opening of the clamping port of the umbrella-shaped foot stand 2 is rounded. In this case, the stress concentration caused by the fracture of the sheet-type sealing lining between the embedded part of the clamping port formed with a semi-open receiving space with the foot stand base plate-type molding can be avoided, thereby extending the service life of the sheet-type sealing lining provided by the embodiment of the present invention.

Among them, the height of the fixed base plate 8 gradually increases from the outer edge of the fixed base plate 8 to the bottom end of the connecting part of the umbrella-shaped foot stand 2 in a streamlined shape. In this case, when the sheet-type sealing liner provided by the embodiment of the present invention is installed on the concrete lining layer 1 to form an underground rock gas storage chamber, even if the underground rock gas storage chamber is in an inflated state, it can avoid the occurrence of stress concentration between the sheet-type sealing liner provided by the embodiment of the present invention and the fixed base plate 8, resulting in fracture, thereby extending the service life of the sheet-type sealing liner provided by the embodiment of the present invention.

Underground Rock Gas Storage Cavern

The underground rock gas storage cavern provided by the embodiment of the present invention includes a concrete lining layer 1 and a sheet-type sealing lining provided by the present invention. The foot-stand bottom plate type stereotypes include a plurality of axial foot-stand bottom plate type stereotypes and a plurality of circumferential foot-stand bottom plate type stereotypes, which are connected in a crisscross pattern to form a hollow space between a plurality of foot-stand bottom plate type skeletons. The outer dimensions of the plurality of axial foot-stand bottom plate type stereotypes and the plurality of circumferential foot-stand bottom plate type stereotypes are adapted to the internal dimensions of the concrete lining layer 1, and the sheet-type sealing lining is disposed in the hollow space through a clamping opening with a semi-open accommodation space, so that the sealing layer 3 adheres to the inner wall of the concrete lining layer 1.

The underground rock gas storage cavern provided by the embodiment of the present invention can utilize the semi-open containment space formed by the foot-plate type stereotypes to embed the sealing layer 3 in the sheet-type sealing lining. Since the height of the semi-open containment space near the connection part of the umbrella-shaped foot-plate is greater than the height of the semi-open containment space near the open side of the umbrella-shaped foot-plate, it can form a fit between the outer edge of the umbrella-shaped foot-plate 2 and the sealing layer 3, thereby avoiding displacement or detachment of the sealing layer 3 and ensuring airtightness. Therefore, it is formed on the inner side of the concrete lining layer 1 of the underground cavern. Its construction period is shorter than that of welded steel plates, with lower cost and good sealing performance. In addition, it is easy to maintain due to its convenient replacement of parts. Under the premise of ensuring its fastening, its airtightness can meet the requirements of use. Since the foot-plate type stereotypes are annular, it can ensure that the underground cavern lining always remains annular and isotropic. In addition, the sealing layer 3 has a short construction period and can be prefabricated, which can save a lot of construction time and lower cost compared to traditional steel plate linings that require on-site welding. During maintenance, it is only necessary to replace the damaged parts directly. The sealing layer 3 of the sheet-type sealing lining provided by the present invention is made of multiple layers, each with a corresponding function, which can make the sealing layer 3 better in terms of airtightness and practicality.

Among them, the concrete lining layer 1 is connected in series in multiple sections, and the sheet-type sealing lining is connected in series through multiple sections of the foot-type base plate molding parts. In this case, due to the clamping openings formed on both sides of the foot-type base plate molding parts with semi-open accommodation spaces, the annular sealing lining after series connection can still ensure airtightness. Moreover, with the help of the foot-type base plate molding parts, the construction cost of series connection is low and installation is convenient.

Construction Method of Underground Rock Gas Storage Cavern

The construction method of the underground rock gas storage cavern provided by the embodiment of the present invention includes the following steps:

According to the inner diameter of the underground chamber, a footrest bottom plate type molding is fixedly arranged on the inner wall of the concrete lining layer 1 of the underground chamber. The footrest bottom plate type molding includes a plurality of axial footrest bottom plate type molding and a plurality of circumferential footrest bottom plate type molding, which are crisscrossed and connected to form a hollow between a plurality of footrest bottom plate type skeletons. The external dimensions of the plurality of axial footrest bottom plate type molding and the plurality of circumferential footrest bottom plate type molding are adapted to the internal dimensions of the concrete lining layer 1;

The sealing layer 3 is embedded in the semi-open holding space of the annular footrest bottom plate shaped part, so that the inner wall of the underground chamber forms a sealed lining structure provided by the embodiment of the present invention.

During the construction process of the underground rock gas storage cavern provided by the embodiment of the present invention, the semi-open storage space formed by the footrest bottom plate shaped part can be used to embed the sealing layer 3 with a sheet-type sealing lining. Since the height of the semi-open storage space near the connection part of the umbrella-shaped footrest is greater than the height of the semi-open storage space near the open side of the umbrella-shaped footrest, the outer edge of the umbrella-shaped footrest 2 can be fitted with the sealing layer 3 to prevent displacement or detachment of the sealing layer 3 and ensure airtightness. Therefore, it is formed on the inner side of the concrete lining layer 1 of the underground cavern. Its construction period is shorter than that of welding steel plates, and its cost is lower. It has good sealing performance and is easy to maintain with convenient replacement of parts. On the premise of ensuring tightness, its airtightness can meet the requirements of use. Since the footrest bottom plate shaped part is circular, it can ensure that the underground cavern lining is always circular and isotropic. In addition, the sealing layer 3 has a short construction period and components can be prefabricated, which can save a lot of construction time and lower costs compared to traditional steel plate lining that requires on-site welding. During maintenance, it is only necessary to replace damaged parts directly. The sealing layer 3 of the sheet-type sealing lining provided by the present invention is made of multiple layers, each with a corresponding function, which can make the sealing layer 3 better in terms of airtightness and practicality.

Among them, according to the inner diameter of the underground chamber, a circular footrest bottom plate-type stereotype is fixedly arranged on the inner wall of the underground chamber, so that the outer diameter of the circular footrest bottom plate-type stereotype is adapted to the inner diameter of the underground chamber. The specific steps include the following:

Drilling a first type of connection hole on the inner wall of the underground chamber;

Adjust the position of the footrest base plate shaped part so that the second connection hole of the footrest base plate shaped part corresponds to the position of the first connection hole on the inner wall of the underground chamber;

The set bolt is simultaneously screwed into the first and second connection holes, so that the footrest base plate shaped part is fixed to the inner wall of the underground chamber.

In this case, the sealing lining structure can be stably fixed to the inner wall of the concrete lining layer 1 of the underground chamber through the first connection hole, the second connection hole, and the set bolt, and the cost is low.

Among them, the sealing layer 3 is embedded in the ring-shaped footrest bottom plate type molding part through a semi-open holding space, so that the inner wall of the underground chamber forms a sealed lining structure provided by the present invention, and the following steps are also included:

Conduct gas storage tests in underground chambers to determine their sealing performance;

Real-time monitoring is conducted for possible gas leakage points in underground caverns.

In this case, real-time monitoring of possible gas leakage points in underground caverns can be carried out to detect and remedy any gas leakage in a timely manner.

In the process of real-time monitoring of possible gas leakage points in the underground chamber, the possible gas leakage points include: the connection between the sealing layer 3 and the foot rest bottom plate molding part, the connection between the connection part of the foot rest bottom plate molding part and the umbrella-shaped part, the connection between the fixed bottom plate 8 of the foot rest bottom plate molding part and the inner wall of the underground chamber, and one or more parts of the sealing layer 3 itself. In this case, it is possible to accurately monitor the possible gas leakage points in the underground chamber in real time.

Among them, real-time monitoring of possible gas leakage points in underground caverns includes the following steps:

Gas flow monitoring instruments shall be installed at potential gas leakage points in underground chambers, and location labels shall be provided for each gas flow monitoring instrument;

Based on the location of the gas flow monitoring instrument, set the alarm threshold for the gas flow monitoring instrument;

When there is an abnormal gas flow alarm, the location of the gas leakage point in the underground chamber can be determined based on the location label of the gas flow monitoring instrument that triggered the alarm.

In this case, once a possible gas leak occurs in the underground chamber, the location of the gas leak can be accurately determined based on the alarm information and the location tag of the gas flow monitoring instrument, so that emergency repair measures can be taken.

Although the preferred embodiments of the present invention have been described, those skilled in the art may make additional changes and modifications to these embodiments once they have learned the basic inventive concept. Therefore, the appended claims are intended to be interpreted as including the preferred embodiments as well as all changes and modifications that fall within the scope of the invention.

Obviously, those skilled in the art can make various modifications and variations to the present invention without departing from the spirit and scope of the invention. In this way, if these modifications and variations of the present invention fall within the scope of the claims and their equivalents, the present invention is also intended to include these modifications and variations.

The invention claimed is:

1. A tripod base plate, characterized in that the tripod base plate (2) is annular, and comprises a fixed base plate (7) and an umbrella shaped tripod (8), wherein the fixed base plate (7) has a length direction and a width direction, wherein the umbrella shaped tripod (8) has a length direction and a width direction, the umbrella shaped tripod (8) including a connecting part and an umbrella shaped part, wherein the umbrella shaped part is set at the top of the connecting part such that the umbrella shaped part faces the connecting part and has protrusions on both sides in the length direction of the umbrella shaped tripod (8), wherein the umbrella shaped tripod (8) is fixedly connected to the fixed base plate (7) along the length direction of the fixed base plate (7) at the connecting part, thereby forming a clamp having a semi open containment space between the umbrella shaped part of the umbrella shaped tripod (8) and the fixed base plate (7), wherein a height of the semi open containment space near the connecting part is h1, a height of the semi open containment space near an open side of the clamp is h2, and h1>h2.

2. The tripod base plate according to claim 1, characterized in that the connecting part of the umbrella shaped tripod (8) is integrally formed with the umbrella shaped part.

3. The tripod base plate according to claim 1, wherein the umbrella shaped tripod (8) is fixedly connected to the fixed base plate (7) by fastening bolts, or the umbrella shaped tripod (8) is integrally formed with the fixed base plate (7).

4. The tripod base plate according to claim 1, characterized in that the tripod base plate (2) is made of corrosion-resistant steel.

5. The tripod base plate according to claim 1, wherein the tripod base plate (2) is integrally formed as an annular member, or the tripod base plate (2) comprises a plurality of fixed base plate shaped member segments that are joined along a width direction to form an annular tripod base plate shaped member (2).

6. A sealed inner lining structure, comprising an airtight layer (3) and at least one tripod base plate (2) as claimed in claim 1, wherein the airtight layer (3) is secured on the tripod base plate (2) by the clamp having the semi open containment space.

7. The sealed lining structure according to claim 6, wherein the airtight layer (3) is made of a material that can deform under pressure.

8. The sealed inner lining structure according to claim 6, wherein the edge of the airtight layer (3) comprises a fitting part that is embedded in the clamp, and wherein the airtight layer (3) is set on the tripod base plate (2) through the fitting part.

9. The sealed inner lining structure according to claim 6, wherein the sealed inner lining structure is set on a cylindrical inner wall, wherein the tripod base plate (2) comprises a plurality of fixed base plate shaped member segments that are joined along a width direction to form an annular tripod base plate shaped member (2) that is coaxial, wherein the annular tripod base plate shaped member is connected as a whole through the airtight layer (3); and wherein the airtight layer (3) is connected to the tripod base plate (2) through the clamp, making the sealed inner lining structure a cylindrical sealed inner lining structure.

10. The sealed inner lining structure according to claim 9, wherein a plurality of the annular tripod base plate members (2) are uniformly arranged along the axial direction of the cylindrical sealed inner lining mechanism.

11. An underground chamber, comprising a concrete lining layer (1) and a sealed inner lining structure as claimed in claim 6, wherein an inner wall of the concrete lining layer (1) is cylindrical, and wherein the sealed inner lining structure is fixed on the inner wall of the concrete lining layer (1) through the fixed base plate of the tripod base plate (2).

12. A method for constructing the underground chamber according to claim 11, comprising:

fixedly arranging the tripod base plate (2) on the inner wall of the underground chamber according to an inner diameter of the underground chamber such that an outer diameter of the tripod base plate (2) matches the inner diameter of the underground chamber, and inserting the airtight layer (3) into the tripod base plate (2) through the clamp so that the inner wall of the underground chamber forms the sealed inner lining structure.

13. The method according to claim 12, wherein fixedly arranging the tripod base plate (2) on the inner wall of the underground chamber comprises drilling a first connecting hole on the inner wall of the underground chamber, adjusting a position of the tripod base plate (2) such that a second connecting hole of the tripod base plate (2) corresponds to the first connecting hole, and screwing a locking bolt (5) into the first connecting hole and the second connecting hole to fix the tripod base plate (2) to the inner wall of the underground chamber.

14. The method according to claim 12, wherein after inserting the airtight layer (3) into the tripod base plate (2) through the clamp such that the inner wall of the underground chamber forms the sealed inner lining structure, the method further comprises conducting a gas storage test on the underground chamber to determine sealing performance and carrying out real-time monitoring for possible air leakage points in the underground chamber.

15. The method according to claim 14, wherein during the real-time monitoring of possible air leakage points in the underground chamber, the possible air leakage points include:

a connection between the airtight layer (3) and the tripod base plate (2), a connection between the connecting part and the umbrella shaped part of the umbrella shaped tripod (8), a connection between the fixed base plate (7) of the tripod base plate (2) and the inner wall of the underground chamber, and one or more portions of the airtight layer (3).

16. The method according to claim 14, wherein real-time monitoring for possible gas leakage points in the underground chamber comprises:

installing gas flow monitoring instruments at potential leakage points in the underground chamber, setting a location label and an alarm threshold for each gas flow monitoring instrument, and determining a leakage point based on the location label of the gas flow monitoring instrument that triggers an abnormal gas flow alarm.

* * * * *